US012000177B2

(12) United States Patent
Carper

(10) Patent No.: US 12,000,177 B2
(45) Date of Patent: Jun. 4, 2024

(54) DRAWER SYSTEM AND DRAWER LOCK

(71) Applicant: Raytheon Company, Tewksbury, MA (US)

(72) Inventor: Brent Carper, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 620 days.

(21) Appl. No.: 16/789,360

(22) Filed: Feb. 12, 2020

(65) Prior Publication Data

US 2021/0246690 A1 Aug. 12, 2021

(51) Int. Cl.

| | |
|---|---|
| ***E05B 65/46*** | (2017.01) |
| ***A47B 88/403*** | (2017.01) |
| ***E05B 65/44*** | (2006.01) |
| ***E05B 65/462*** | (2017.01) |
| ***E05B 65/463*** | (2017.01) |

(Continued)

(52) U.S. Cl.

CPC .......... *E05B 65/463* (2013.01); *A47B 88/403* (2017.01); *E05B 65/462* (2013.01); *E05B 65/464* (2013.01); *A47B 67/04* (2013.01); *E05Y 2201/22* (2013.01); *E05Y 2900/20* (2013.01)

(58) Field of Classification Search

CPC ... E05B 65/463; E05B 65/462; A47B 88/403; E05Y 2900/20

See application file for complete search history.

(56) References Cited

U.S. PATENT DOCUMENTS

| | | | |
|---|---|---|---|
| 3,774,985 | A | 11/1973 | Chovanec et al. |
| 3,957,324 | A | 5/1976 | Klenik, Jr. et al. |
| 4,303,287 | A | 12/1981 | Taplin |

(Continued)

FOREIGN PATENT DOCUMENTS

| | | | |
|---|---|---|---|
| CN | 204402201 | U | 6/2015 |
| DE | 202006013213 | U1 | 11/2006 |

(Continued)

*Primary Examiner* — Kimberley S Wright

(74) *Attorney, Agent, or Firm* — Schwegman Lundberg & Woessner, P.A.

(57) ABSTRACT

A bidirectional drawer system is disclosed. The bidirectional drawer system can include a frame. The bidirectional drawer system can also include first and second drawers slidably coupled to the frame. Each of the first and second drawers can be movable between a retracted position and first and second extended positions on opposite sides of the retracted position. In addition, the bidirectional drawer system can include a drawer interlock mechanism. The drawer interlock mechanism can include first and second interlock portions associated with the first and second drawers, respectively. The first interlock portion can have a cam with a cam surface, and a cam follower operable to interface with the cam surface. The second interlock portion can have a cam lock with a cam lock surface, and cam follower operable to interface with the cam lock surface. With the first and second drawers in the retracted positions, movement of the first drawer toward the first extended position can cause the cam follower of the first interlock portion to engage the cam surface and the cam follower of the second interlock portion to engage the cam lock surface thereby preventing movement of the second drawer out of the retracted position.

16 Claims, 12 Drawing Sheets

(51) Int. Cl.
*E05B 65/464* (2017.01)
*A47B 67/04* (2006.01)

(56) References Cited

U.S. PATENT DOCUMENTS

| | | | | |
|---|---|---|---|---|
| 4,441,767 | A | 4/1984 | Stark | |
| 4,453,787 | A | 6/1984 | Staropoli | |
| 5,056,876 | A | 10/1991 | Scheerhorn | |
| 5,333,949 | A | 8/1994 | McGregor | |
| 5,335,986 | A * | 8/1994 | Hartrum | E05B 65/463 312/220 |
| 5,375,922 | A | 12/1994 | Brustle et al. | |
| 5,411,327 | A | 5/1995 | Norton | |
| 5,702,167 | A * | 12/1997 | Muller | E05B 65/464 312/217 |
| 5,829,859 | A | 11/1998 | Cram | |
| 6,186,606 | B1 | 2/2001 | Krei | |
| 6,497,462 | B2 | 12/2002 | Jackson | |
| 6,568,771 | B2 | 5/2003 | Gentili et al. | |
| 6,722,749 | B1 | 4/2004 | Pagac | |
| 6,979,064 | B2 | 12/2005 | Chiu | |
| 7,823,992 | B2 | 11/2010 | Chen et al. | |
| 8,414,094 | B2 | 4/2013 | Chi et al. | |
| 8,651,591 | B1 | 2/2014 | Chen et al. | |
| 8,696,074 | B2 | 4/2014 | Romaen et al. | |
| 8,770,680 | B1 | 7/2014 | Chen et al. | |
| 9,382,730 | B1 * | 7/2016 | Chen | E05B 65/462 |
| 10,145,149 | B2 | 12/2018 | Westwinkel et al. | |
| 2004/0130246 | A1 * | 7/2004 | Dube | E05B 65/464 312/221 |
| 2008/0203862 | A1 * | 8/2008 | Sevillano Gil | E05B 65/464 312/216 |
| 2009/0160298 | A1 * | 6/2009 | Chen | E05B 65/463 312/333 |
| 2012/0187816 | A1 * | 7/2012 | Chen | E05B 65/463 312/334.8 |
| 2017/0079428 | A1 * | 3/2017 | Chen | H05K 7/1489 |

FOREIGN PATENT DOCUMENTS

| | | | |
|---|---|---|---|
| DE | 202013100195 | U1 | 2/2013 |
| FR | 1454844 | A | 10/1966 |
| JP | 3196556 | U | 3/2015 |

* cited by examiner

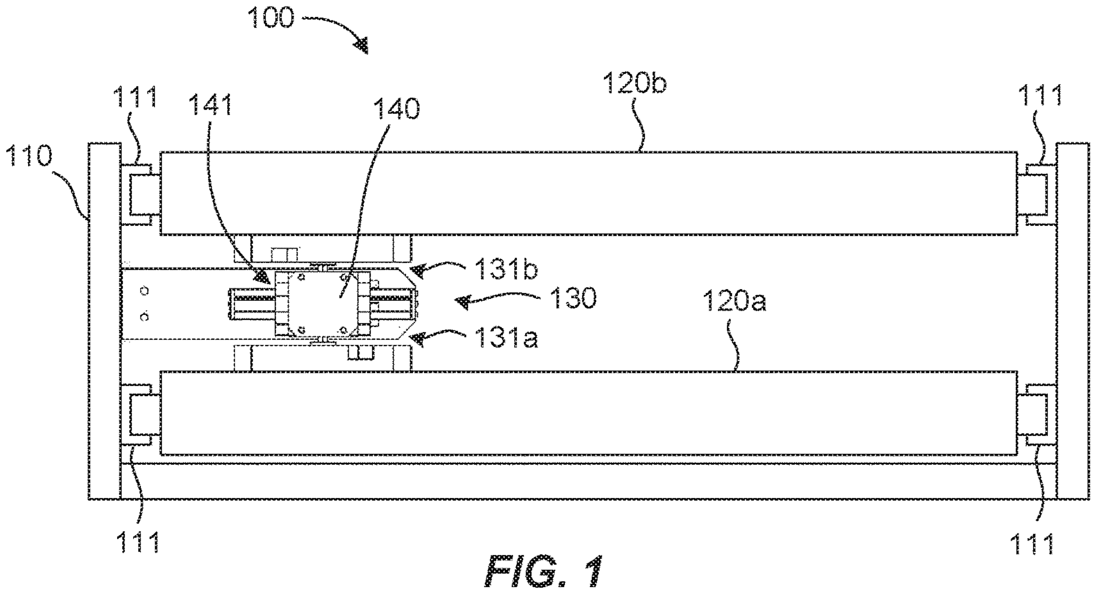
FIG. 1
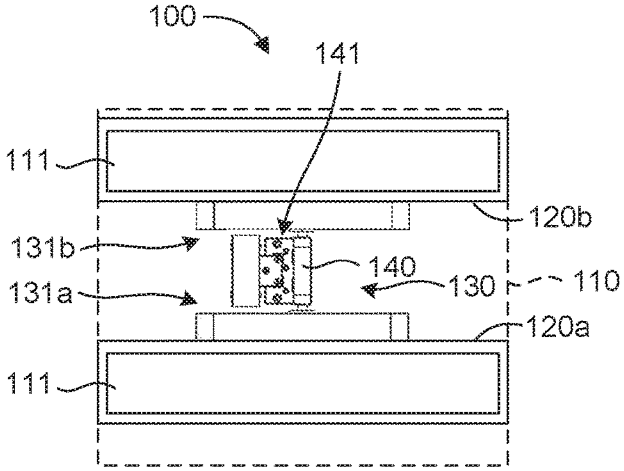
FIG. 2A
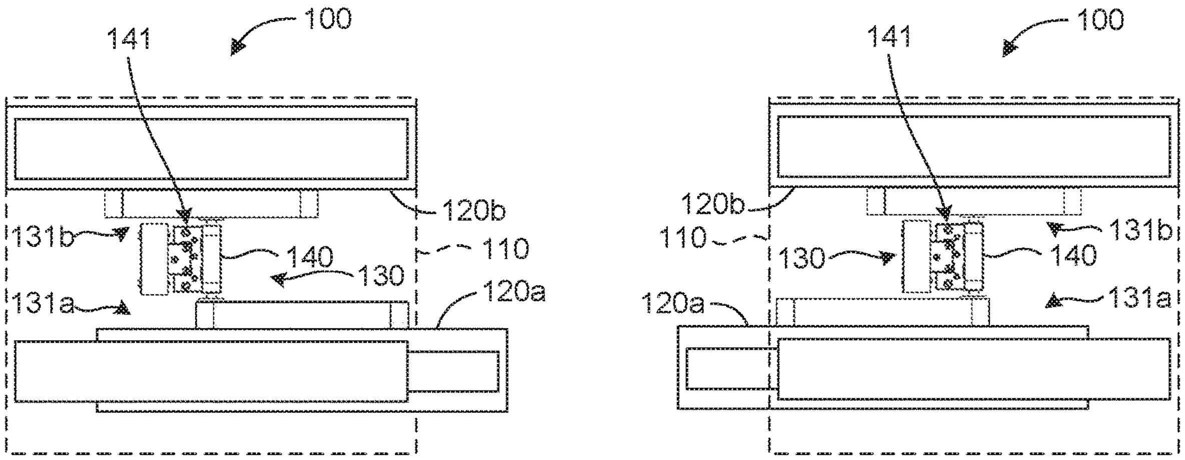
FIG. 2B
FIG. 2C

DRAWER SYSTEM AND DRAWER LOCK

BACKGROUND

It is common for desks, file cabinets, toolboxes, etc. to include drawer locks that only allow one drawer to be pulled out at a time. Often such drawer locks are utilized to prevent an unstable or unsafe condition due to instability that may arise when multiple drawers are placed in an extended position at the same time. Drawer locks have been implemented utilizing a variety of mechanisms that may be actively or passively actuated.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 1 is a front view of a drawer system in accordance with an example of the present disclosure.

FIG. 2A is a side view of the drawer system of FIG. 1, showing drawers in retracted positions.

FIG. 2B is a side view of the drawer system of FIG. 1, showing one drawer in a first extended position.

FIG. 2C is a side view of the drawer system of FIG. 1, showing one drawer in a second extended position.

Figure 3A:
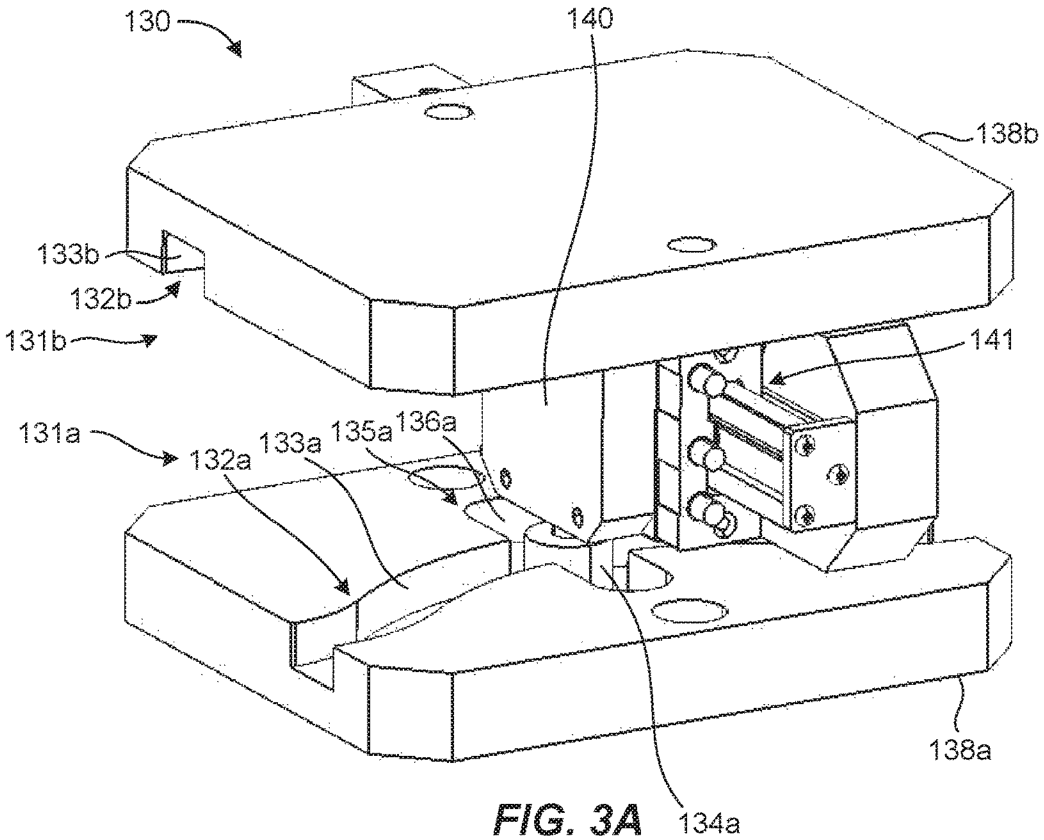
FIG. 3A is a top perspective view of a drawer interlock mechanism of the drawer system of FIG. 1, in accordance with an example of the present disclosure.
Figure 3B:
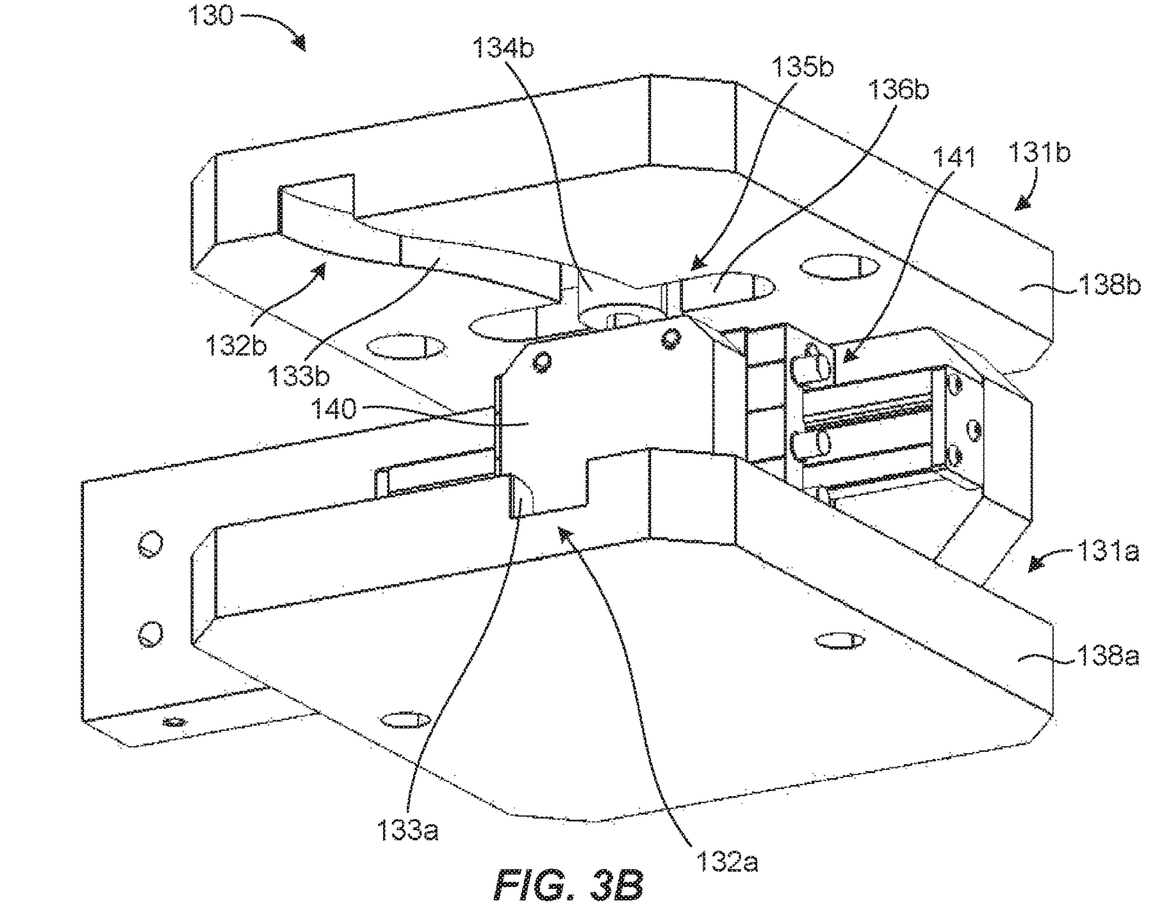
FIG. 3B is a bottom perspective view of the drawer interlock mechanism of the drawer system of FIG. 1, in accordance with an example of the present disclosure.
Figure 3C:
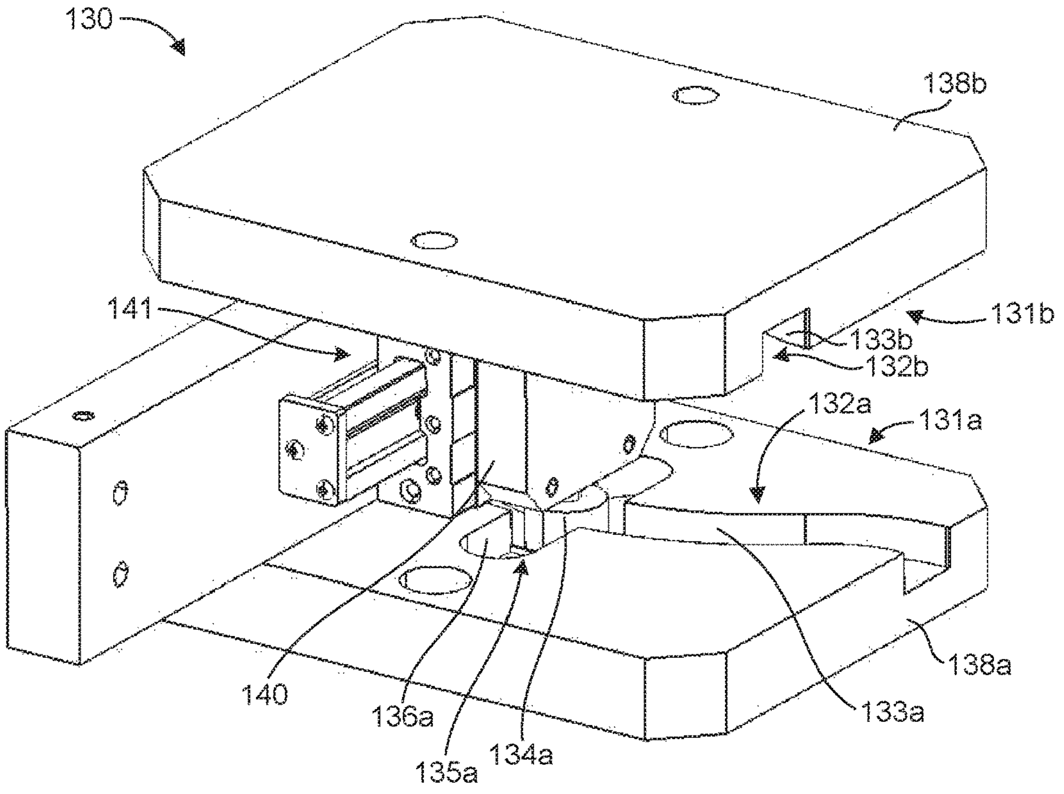
FIG. 3C is a top perspective view of the drawer interlock mechanism of the drawer system of FIG. 1, in accordance with an example of the present disclosure.
Figure 3D:
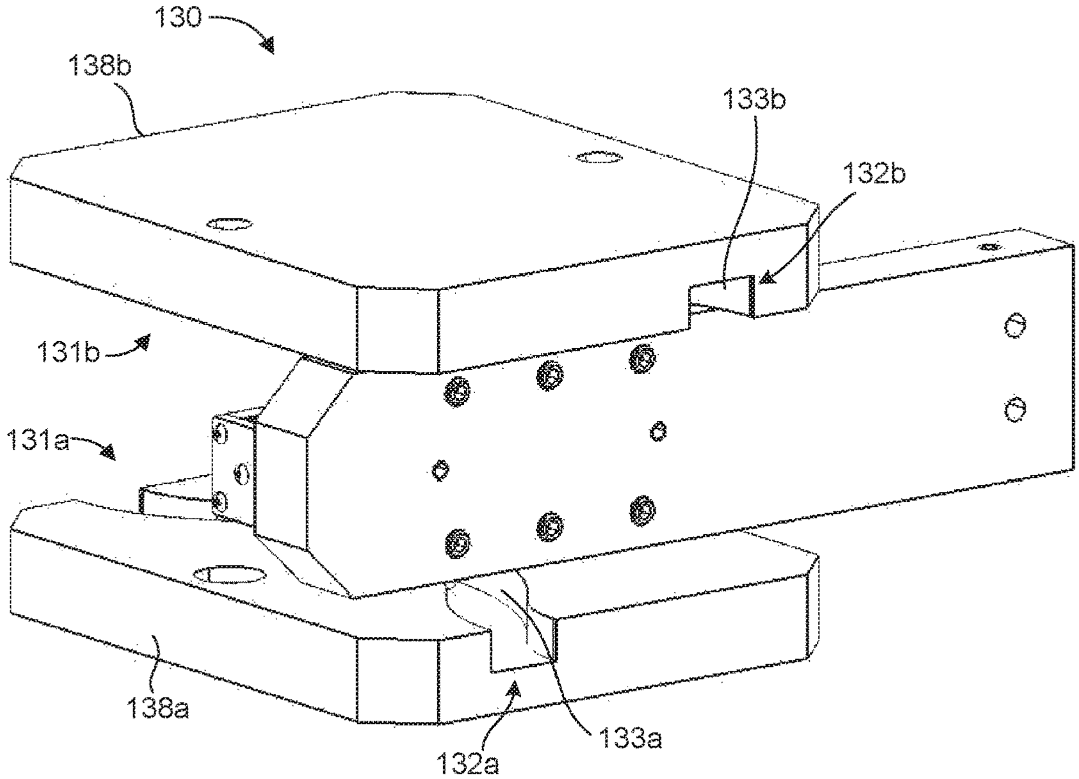
FIG. 3D is a top perspective view of the drawer interlock mechanism of the drawer system of FIG. 1, in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Although it is common for desks, file cabinets, toolboxes, etc. to include drawer locks, such drawer locks are seldom found on, or applicable to, bidirectional drawers (drawers that are able to be pulled out in two directions). Additionally, many of the drawer locks that are found on unidirectional drawers (drawers that are able to be pulled out in a single direction) have designs that may successfully lock drawers when only one drawer is pulled out at a time, but that also allow multiple drawers to be pulled out simultaneously. Thus, unstable or unsafe conditions can arise when using many bidirectional or unidirectional drawer designs.

Accordingly, a bidirectional drawer system is disclosed that includes a drawer locking mechanism for bidirectional drawers. The bidirectional drawer system can include a frame. The bidirectional drawer system can also include first and second drawers slidably coupled to the frame. Each of the first and second drawers can be movable between a retracted position and first and second extended positions on opposite sides of the retracted position. In addition, the bidirectional drawer system can include a drawer interlock mechanism. The drawer interlock mechanism can include first and second interlock portions associated with the first and second drawers, respectively. The first interlock portion can have a cam with a cam surface, and a cam follower operable to interface with the cam surface. The second interlock portion can have a cam lock with a cam lock surface, and a cam follower operable to interface with the cam lock surface. With the first and second drawers in the retracted positions, movement of the first drawer toward the first extended position can cause the cam follower of the first interlock portion to engage the cam surface, and the cam follower of the second interlock portion to engage the cam lock surface, thereby preventing movement of the second drawer out of the retracted position.

A drawer system is also disclosed that can include a frame. The drawer system can also include first and second drawers slidably coupled to the frame. Each of the first and second drawers can be movable between a retracted position and an extended position. Additionally, the drawer system can include a drawer interlock mechanism. The drawer interlock mechanism can include first and second interlock portions associated with the first and second drawers, respectively. Each of the first and second interlock portions can have a cam with a cam surface, and a cam follower operable to interface with the cam surface. With the first and second drawers in the retracted positions, movement of the first and second drawers toward the extended positions can cause the cam followers of the first and second interlock portions to bindingly engage the respective cam surfaces of the first and second interlock portions, such that the first and second drawers are prevented from moving to the extended positions.

To further describe the present technology, examples are now provided with reference to the figures. With reference to FIG. 1, one embodiment of a drawer system 100 is illustrated and shown in a front view. FIGS. 2A-2C show side views of the drawer system 100. The drawer system 100 can comprise a frame 110 and multiple drawers 120*a*, 120*b* slidably coupled to the frame 110. As used herein, the term "drawer" refers to any type of sliding receptacle (e.g., a box, compartment, tray, rack, etc.) that may typically be used for storage or to hold or support one or more objects. The frame 110 and drawers 120*a*, 120*b* can be of any suitable configuration, such as a file cabinet, a chest of drawers, a desk, a cart (e.g., a beverage and/or food cart, a transportation cart (e.g., for material handling), etc.), a rack (e.g., for storing missiles), an assembly stand (e.g., including tooling and/or fixtures), and others, as will be apparent to those skilled in the art. In some examples, the principles disclosed herein can be adapted to a clean room airlock (e.g., a drawer can represent a door for the airlock) to ensure that only one door can be opened at a time.

In some examples, the frame 110 can comprise beams or other support structures that form a framework. In a particular example, the frame 110 can be configured such that the drawers 120*a*, 120*b* are largely exposed (e.g., in a rack configuration). In some examples, the frame 110 can comprise a housing structure (with or without a framework of beams) that largely conceals the drawers 120*a*, 120*b* (e.g., in a file cabinet configuration). Although two drawers 120*a*, 120*b* are illustrated, this is not to be limiting in any way as the concepts disclosed herein can be implemented to work with any suitable number of drawers can. The drawers 120*a*, 120*b* can be slidably coupled to the frame 110 in any suitable manner, such as with one or more slider assemblies 111, which can include wheels, rollers, bearings, or any combination of these configured to slide and/or roll along a rail or track.

In some examples, one or more of the drawers 120*a*, 120*b* can be configured to move unidirectionally from a retracted position to an extended position relative to the frame 110, such as in a typical file cabinet or chest of drawers. The retracted position refers to that position when a drawer 120*a*, 120*b* is "closed" or in a stowed position. In FIG. 2A, the drawers 120*a*, 120*b* are each shown in a retracted position. An extended position refers to that position when a drawer 120*a*, 120*b* is "opened" or fully extended in its range of motion from the frame 110 (e.g., to provide access to the drawer's contents). Each of FIGS. 2B and 2C show the drawer 120*a* in two different extended positions. In some examples, the drawer 120*a* can be configured to move unidirectionally (i.e., moved outward from only one side of the frame 110 and the retracted position (i.e., able to be pulled outward in a single direction) to either one of the extended positions shown in FIG. 2B or 2C. The drawer 120*b* may be similarly configured. A drawer 120*a*, 120*b* is typically opened by pulling the drawer "out" of the frame 110 and closed by pushing the drawer "into" the frame 110. In some examples, one or more of the drawers 120*a*, 120*b* can be configured to move bidirectionally from a retracted position relative to the frame 110 (i.e., moved outward from opposite sides of the frame 110 and the retracted position (i.e., able to be pulled outward in two directions) to both of the extended positions shown in FIGS. 2B and 2C. The drawer 120*b* may be similarly configured.

The drawer system 100 can also comprise a drawer interlock mechanism 130 to maintain or lock one or more closed drawers in place (e.g., in a retracted position) while another drawer is opened or moved to an extended position. The drawer interlock mechanism 130 is shown isolated from the drawers 120*a*, 120*b* in FIGS. 3A-3D. The drawer interlock mechanism 130 can include interlock portions 131*a*, 131*b* associated with the respective drawers 120*a*, 120*b*. Certain portions of the drawer system 100 and the drawer interlock mechanism 130 are shown isolated in FIGS. 4 and 5.

The interlock portion 131*a* can have a cam 132*a* with a cam surface 133*a*. The interlock portion 131*a* can also have a cam follower 134*a* (FIG. 4) operable to interface with the cam surface 133*a*. The interlock portion 131*a* can include a cam lock 135*a* with a cam lock surface 136*a*. The cam follower 134*a* can be operable to interface with the cam lock surface 136*a*. Similarly, the interlock portion 131*b* can have a cam 132*b* with a cam surface 133*b*. The interlock portion 131*b* can also have a cam follower 134*b* (FIG. 4) operable to interface with the cam surface 133*b*. The interlock portion 131*b* can include a cam lock 135*b* with a cam lock surface 136*b*. The cam follower 134*b* can be operable to interface with the cam lock surface 136*b*.

The cams 132*a*, 132*b* and the cam locks 135*a*, 135*b* can have any suitable form or configuration. For example, the cams 132*a*, 132*b* and the cam locks 135*a*, 135*b* are illustrated in the figures as recesses formed in cam plates 138*a*, 138*b*, with the cam surfaces 133*a*, 133*b* and the cam lock surfaces 136*a*, 136*b* forming side walls of the recesses. It should be recognized that the cams 132*a*, 132*b* and the cam locks 135*a*, 135*b* can be formed as protrusions, where the cam surfaces 133*a*, 133*b* and the cam lock surfaces 136*a*, 136*b* form side walls of the protrusions. Furthermore, each of the cams 132*a*, 132*b* and the cam locks 135*a*, 135*b* is illustrated as a single, unitary component, however, it should be recognized that the cams 132*a*, 132*b* and the cam locks 135*a*, 135*b* can be formed of multiple, discrete, and individual components that may or may not be in direct contact with one another.

As described in more detail below, the cam surfaces 133*a*, 133*b* can define tracks or paths for movement of the respective cam followers 134*a*, 134*b* relative to the cams 132*a*, 132*b*. In some examples, the cam surfaces 133*a*, 133*b* can comprise curved surfaces that can define a curved track or path. In some examples, the cam surfaces 133*a*, 133*b* can comprise planar surfaces that can define a straight track, path, or profile. Curved and planar surfaces can be utilized exclusive of one another or in any combination to achieve a desired track or path for relative movement of the cams 132*a*, 132*b* and the cam followers 134*a*, 134*b*. The cam locks 135*a*, 135*b* can be configured to mechanically block movement of the cam followers 134*a*, 134*b* in a direction parallel to the direction of drawer movement. In one aspect, the cam locks 135*a*, 135*b* can include cam lock surfaces 136*a*, 136*b* configured to mechanically block bidirectional movement of the cam followers 134*a*, 134*b* in a direction parallel to the direction of drawer movement. The cam followers 134*a*, 134*b* can be of any suitable configuration or construction. For example, the cam followers 134*a*, 134*b* can comprise a pin, a roller, a wheel, a peg, a tab, or any other device or structure operable to interface with, and move relative to (e.g., roll and/or slide along), the cam surfaces 133*a*, 133*b*.

As shown in FIGS. 1-2C, the cam 132*a* of the interlock portion 131*a* can be coupled to the drawer 120*a*, and the cam 132*b* of the interlock portion 131*b* can be coupled to the drawer 120*b*. In the illustrated example, the cam 132*a* of the interlock portion 131*a* is coupled to a top side of the drawer 120*a*, and the cam 132*b* of the interlock portion 131*b* is coupled to a bottom side of the drawer 120*b*. Thus, in this example, the drawer interlock mechanism 130 is located between the drawers 120*a*, 120*b*.

Figure 4:
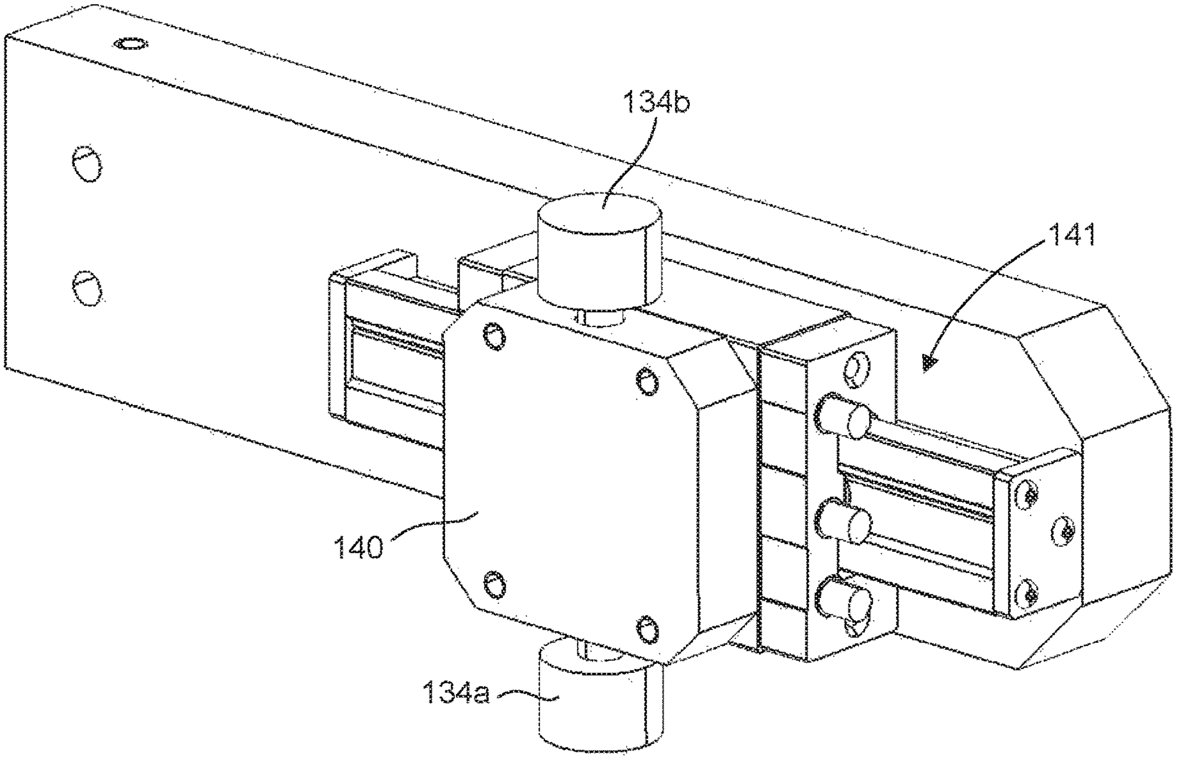
FIGS. 4 and 5 illustrate portions of the drawer system of FIG. 1 and the drawer interlock mechanism, in accordance with an example of the present disclosure.

As shown in FIGS. 3A-4, the cam followers 134*a*, 134*b* of the interlock portions 131*a*, 131*b* can be coupled to one another in a fixed relationship (i.e., the cam followers 134*a*, 134*b* are maintained in a spatial relationship with one another). For example, the cam followers 134*a*, 134*b* can be coupled to, and supported by (e.g., mounted on), a carriage 140. The carriage 140 can be slidably coupled to the frame 110, such as with a slider assembly 141, which can include wheels, rollers, bearings, or a combination of these, or other suitable components configured to slide and/or roll along a rail or track. In one aspect, the slider assembly 141 can be configured to facilitate movement of the carriage 140 and the cam followers 134*a*, 134*b* in a direction transverse (e.g., orthogonal) to movement of the drawers 120*a*, 120*b*. In the example illustrated in FIGS. 1-2C, the slider assembly 141 is configured to facilitate lateral or horizontal movement of the carriage 140 and the cam followers 134*a*, 134*b*.

Although the cams 132*a*, 132*b* are shown coupled to the respective drawers 120*a*, 120*b*, and the cam followers 134*a*, 134*b* are shown coupled to one another in a fixed relationship and configured to move in a direction transverse to movement of the drawers 120*a*, 120*b*, it should be recognized that the cam followers 134*a*, 134*b* can be coupled to the respective drawers 120*a*, 120*b* and the cams 132*a*, 132*b* can be coupled to one another in a fixed relationship and configured to move in a direction transverse to movement of the drawers 120*a*, 120*b*.

Figure 5:
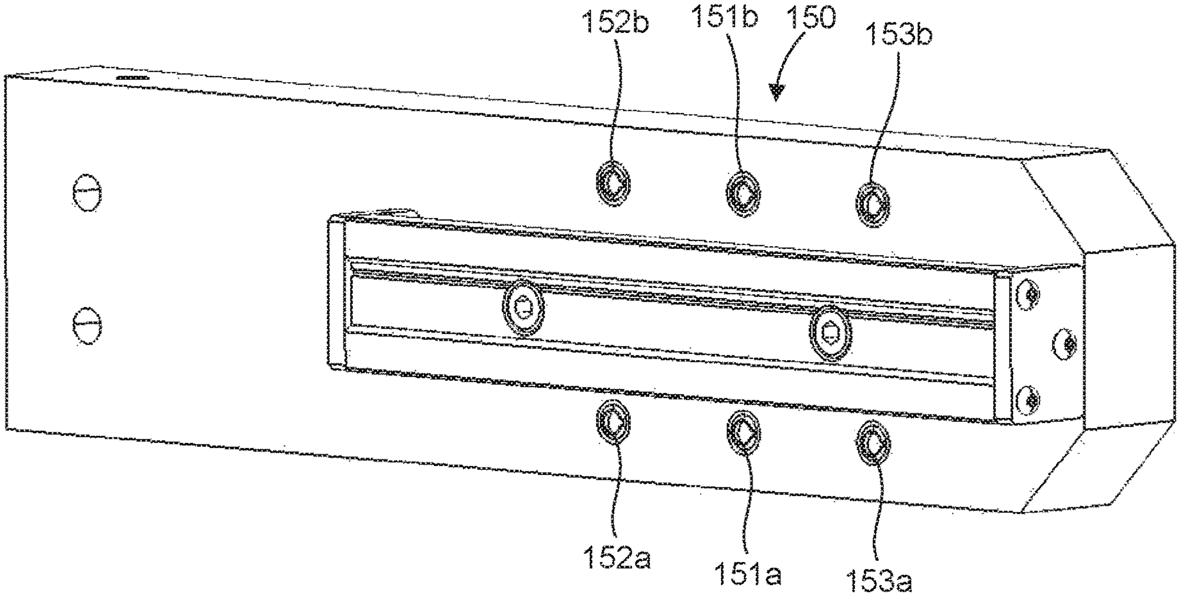

In some examples, as illustrated in FIG. 5, the drawer system 100 can include a position lock mechanism 150 operable to resist movement of the drawers 120*a*, 120*b* from a given position, such as a retracted position illustrated in FIG. 2A and/or one or both of the extended positions illustrated in FIGS. 2B and 2C. The position lock mechanism 150 can serve as a secondary drawer lock to prevent unwanted movement of a drawer 120*a*, 120*b*. The position lock mechanism 150 can be of any suitable type or construction. In the illustrated example, the position lock mechanism 150 comprises a detent. Any suitable type of detent may be utilized. For example, a detent can include ball plungers 151*a-b*, 152*a-b*, 153*a-b* configured to engage recesses (hidden from view). The ball plungers 151*a-b* can be configured to lock the respective drawers 120*a*, 120*b* in the retracted position illustrated in FIG. 2A. The ball plungers 152*a-b* can be configured to lock the respective drawers 120*a*, 120*b* in one extended position, and the ball plungers 153*a-b* can be configured to lock the respective drawers 120*a*, 120*b* in the other extended position. A detent can be adapted to lock a position of the drawers 120*a*, 120*b* in any suitable manner. In the illustrated example, the ball plungers 151*a-b*, 152*a-b*, 153*a-b* are associated with a fixed object (e.g., a portion of the frame 110), and recesses are associated with a movable object (e.g., a sliding portion of the slider assembly 141 or the carriage 140). It should be recognized that the ball plungers 151*a-b*, 152*a-b*, 153*a-b* can be associated with a movable object (e.g., a sliding portion of the slider assembly 141 or the carriage 140), and that recesses can be associated with a fixed object (e.g., a portion of the frame 110).

FIGS. 6A-6D illustrate action of the drawer interlock mechanism 130 in use, as shown in a series of top views. For clarity, structures such as the frame 110 and the drawers 120*a*, 120*b* have been omitted, although FIGS. 2A-2C are referenced to illustrate relative positions of the frame 110 and the drawers 120*a*, 120*b* in relation to the various components of the drawer interlock mechanism 130 in use. The cam 132*a* and the cam lock 135*a* are illustrated with solid lines and the cam 132*b* and the cam lock 135*b* are illustrated with broken lines. In this example, the cam follower 134*b* is located directly above the cam follower 134*a*, and therefore in the top views of FIGS. 6A-6D the cam follower 134*b* appears superimposed over the cam follower 134*a*.

Figure 6A:
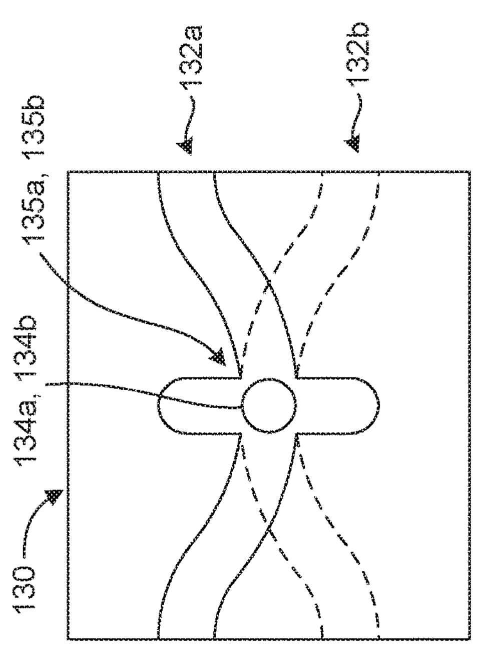
FIGS. 6A-6D are top views of a drawer interlock mechanism of the drawer system of FIG. 1 in operation, in accordance with an example of the present disclosure.
Figure 6B:
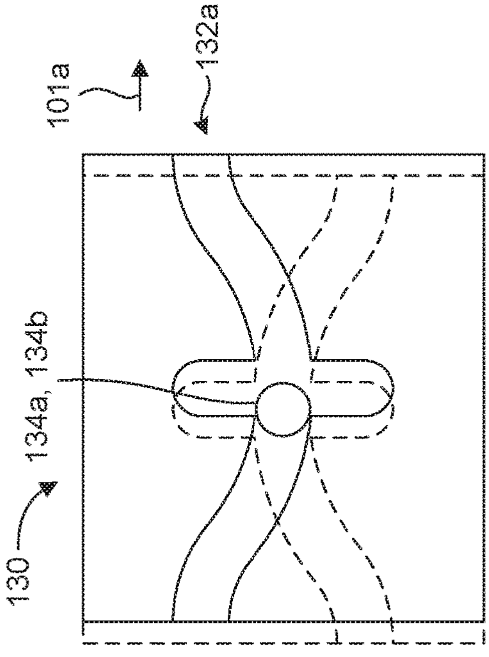
Figure 6C:
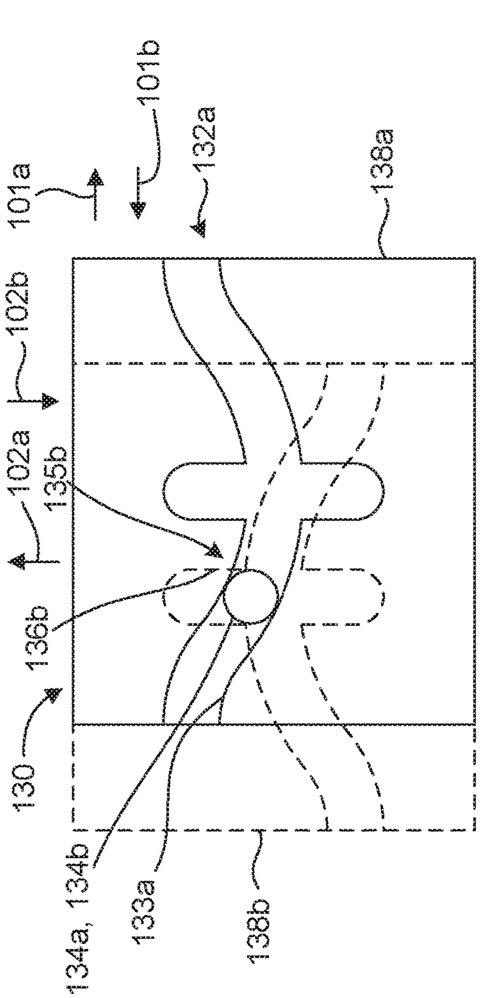
Figure 6D:
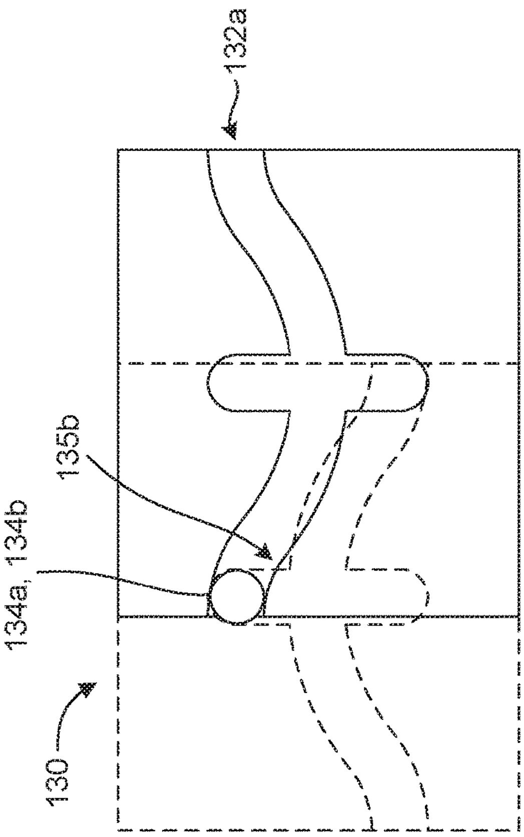

FIG. 6A illustrates the drawer interlock mechanism 130 with the drawers 120*a*, 120*b* in the retracted positions (see FIG. 2A). As explained in more detail below, with the drawers 120*a*, 120*b* in the retracted positions, movement of the drawer 120*a* toward its extended position can cause the cam follower 134*a* of the interlock portion 131*a* to engage the cam surface 133*a*, and the cam follower 134*b* of the interlock portion 131*b* to engage the cam lock surface 136*b* thereby preventing movement of the drawer 120*b* out of its retracted position. For example, in FIG. 6B, the drawer 120*a* is initially moved in direction 101*a* toward the extended position and the cam 132*a* has made initial contact with the cam follower 134*a*. At this point, the cam follower 134*a* has not moved, and therefore the cam follower 134*b* has also not moved. In FIG. 6C, the cam 132*a* has moved further in the direction 101*a* toward the extended position and has now fully engaged the cam follower 134*a*. The cam follower 134*a* is constrained to move in a direction 102 (e.g., due to the slider assembly 141), which is transverse to the direction 101*a*. Thus, as the cam 132*a* moves in direction 101*a*, the cam follower 134*a* is acted on by the cam 132*a* and moves in direction 102. Since the cam follower 134*b* is in a fixed spatial relationship with the cam follower 134*a*, the cam follower 134*b* likewise moves in direction 102. The cam lock 135*b* is configured to receive the cam follower 134*b*, which is moved in direction 102 into engagement with the cam lock 135*b*. Because the cam follower 134*b* is constrained to move in a direction that is not parallel to the direction 101*a* (i.e., the direction of travel of the drawer 120*b* from the retracted position to an extended position), the engagement of the cam follower 134*b* with the cam lock 135*b* maintains or locks the drawer 120*b* in place in the retracted position. Thus, movement of the drawer 120*a* toward the extended position is operable to actuate a mechanism that prevents the drawer 120*b* from moving out of the retracted position. FIG. 6D shows the relationship of the cam 132*a* with the cam follower 134*a*, and the relationship of the cam follower 134*b* with the cam lock 135*b* when the drawer 120*a* is moved fully into the extended position. The cam 132*a* can be configured to position the cam follower 134*b* into the cam lock 135*b* sufficient to adequately secure the drawer 120*b* and prevent movement of the drawer 120*b* out of the retracted position. In one aspect, the cam 132*a* can be configured with a curved cam interface surface 133*a* to provide a gradual, non-binding engagement with the cam follower 134*a* that provides smooth action during operation.

As the drawer 120*a* is moved in the direction 101*b* and back into place in the retracted position, the cam 132*a* acts on the cam follower 134*a* and causes the cam follower 134*a* to move in direction 102*b*, which also causes the cam follower 134*b* to move in direction 102*b* out of engagement with the cam lock 135*b*. This action resets the cam followers

134*a*, 134*b* to their original positions, where either drawer 120*a*, 120*b* may be moved to the retracted position for access.

Although the above description of FIGS. 6A-6D addresses unidirectional operation of the drawer 120*a* and the drawer interlock mechanism 130, it should be recognized that the drawer 120*a* and the drawer interlock mechanism 130 may be operated bidirectionally (i.e., the drawer 120*a* can be moved in direction 101*b* from the retracted position to an extended position). Additionally, it should be recognized that operation of the drawer interlock mechanism 130 when the drawer 120*b* is moved from the retracted to the extended position(s) is similar to that described above with regard to movement of the drawer 120*a*.

Figure 7A:
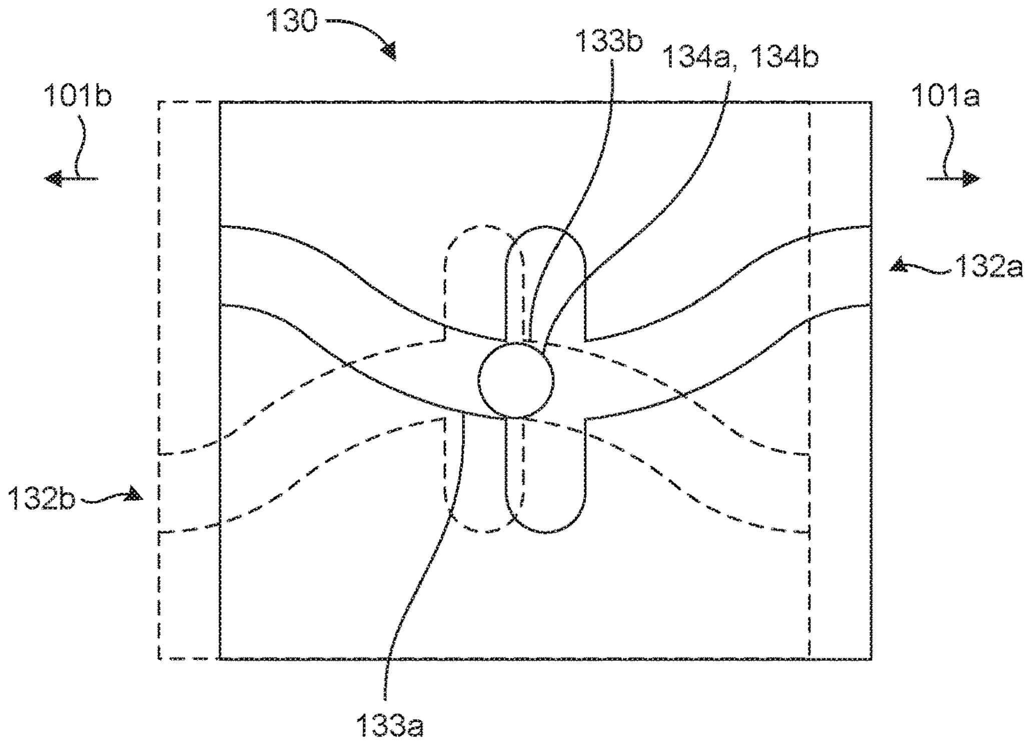
FIGS. 7A and 7B are top views of a drawer interlock mechanism of the drawer system of FIG. 1 showing a binding engagement that prevents simultaneous movement of drawers to extended positions, in accordance with an example of the present disclosure.
Figure 7B:
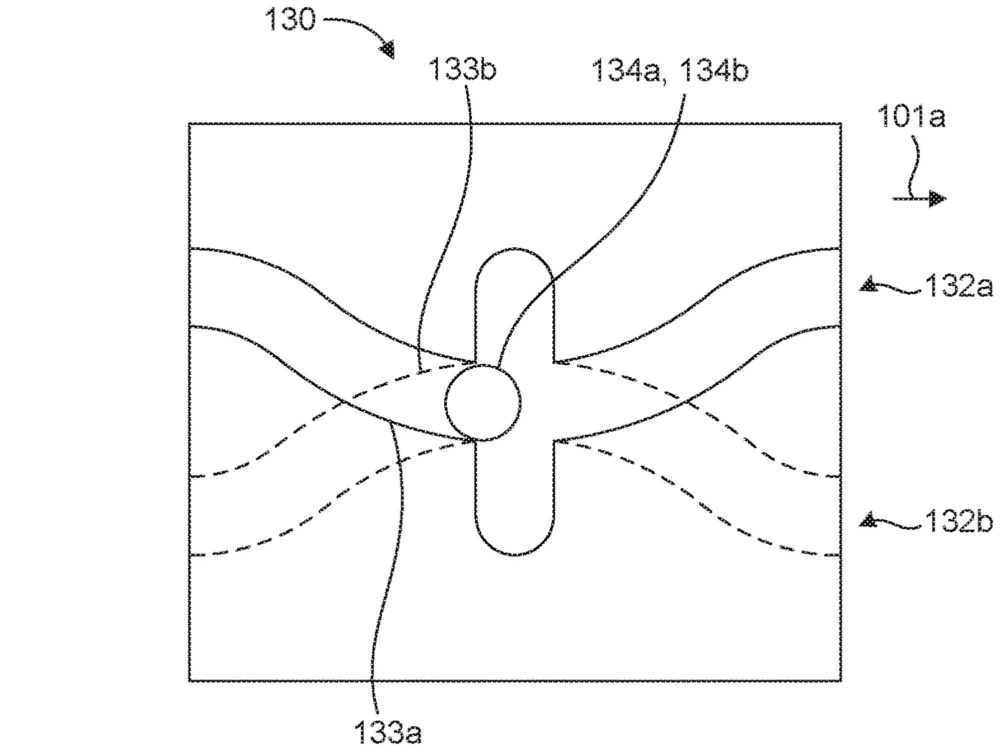
Figure 8A:
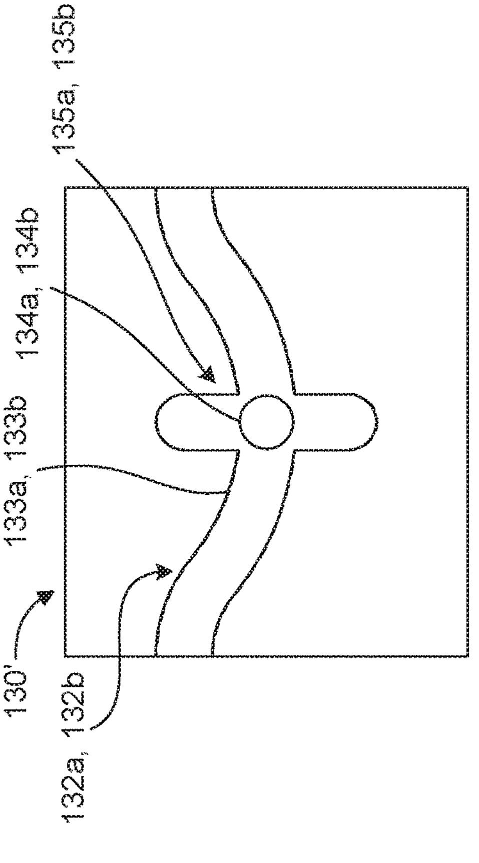
FIGS. 8A-8D are top views of a drawer interlock mechanism in operation, in accordance with an example of the present disclosure.
Figure 8B:
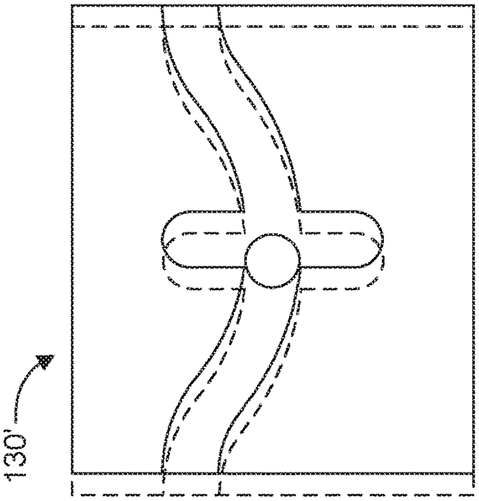
Figure 8C:
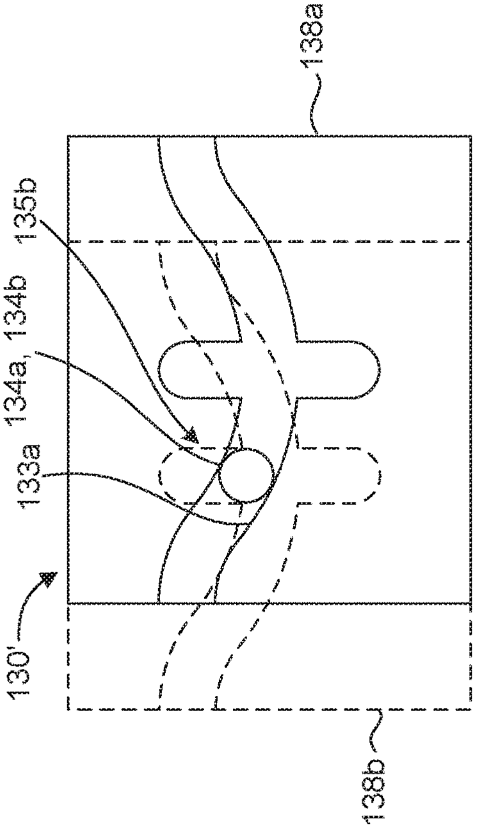
Figure 8D:
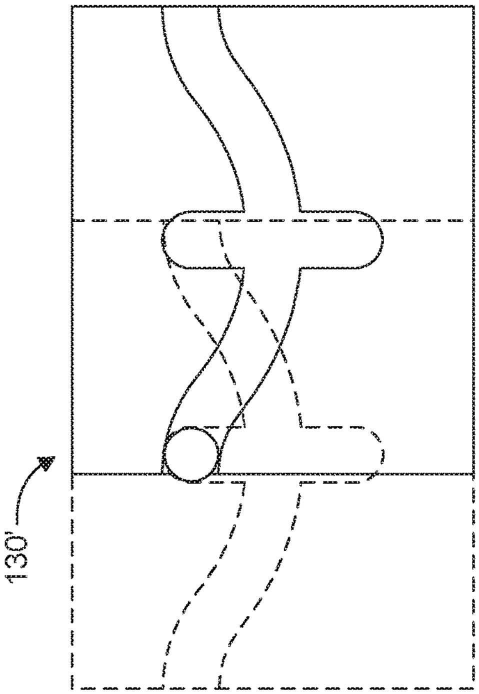

In one aspect, shown in FIGS. 7A and 7B, with the drawers 120*a*, 120*b* in the retracted position, movement of the drawers 120*a*, 120*b* toward an extended position can cause the cam followers 134*a*, 134*b* to bindingly engage the respective cam surfaces 133*a*, 133*b* of the interlock portions 131*a*, 131*b*, such that the drawers 120*a*, 120*b* are prevented from moving to the extended positions at the same time. For example, as illustrated in FIG. 7A, movement of the drawers 120*a*, 120*b* in opposite directions 101*a*, 101*b* toward their extended positions can cause the cam followers 134*a*, 134*b* to bindingly engage the respective cams 132*a*, 132*b* (e.g., the cam surfaces 133*a*, 133*b*). As illustrated in FIG. 7B, movement of the drawers 120*a*, 120*b* in the same direction 101*a* (or 101*b*) toward their extended positions can cause the cam followers 134*a*, 134*b* to bindingly engage the respective cams 132*a*, 132*b*. Such a binding engagement can be achieved by configuring the cams 132*a*, 132*b* to cause the respective cam followers 134*a*, 134*b* to follow different paths. This can be accomplished in a variety of ways. In the illustrated example, the cams 132*a*, 132*b* are similarly configured (e.g., similar path configuration or profile (in size, shape, curvature, etc.)), but oppositely oriented or mirrored (e.g., the cam surface 133*a* is oriented concave in one direction and the cam surface 133*b* is oriented concave in the opposite direction). In some examples, the cams 132*a*, 132*b* can be oriented in the same direction, but can have different configurations (e.g., different path configurations or profiles). In one example, the cam 132*a* can have a curved profile and the cam 132*b* can have a linear profile. In another example, the cams 132*a*, 132 can each have a curved profile, but the curvatures can be different or do not match (e.g., one can curve sharply near the retracted position and the other can be less curved near the retracted position).

In one aspect, illustrated in FIGS. 8A-8D, a drawer interlock mechanism 130' can include the cams 132*a*, 132*b* with the cam surfaces 133*a*, 133*b*, respectively, that are similarly configured (e.g., similar path configuration or profile) and similarly oriented (e.g., in the same direction). Operation of the drawer interlock mechanism 130' is similar to that described above for the drawer interlock mechanism 130 in FIGS. 6A-6D. However, because the cams 132*a*, 132*b* are similarly configured and oriented, simultaneously moving associated drawers from retracted to extended positions will not result in binding with the cam followers 134*a*, 134*b*.

In one aspect, the cam plates 138*a*, 138*b* can be identical. Thus, the cam plates 138*a*, 138*b* can be oriented to orient the cams 132*a*, 132*b* in any desired relationship. For example, the cam plates 138*a*, 138*b* can be oriented as in FIGS. 6A-7B where the cams 132*a*, 132*b* are oppositely oriented or mirrored to facilitate binding engagement with the cam followers 134*a*, 134*b* that prevents simultaneous movement of the drawers 120*a*, 120*b* to the retracted positions. Although the cam plates 138*a*, 138*b* are oriented with the concave curvature of the cams 132*a*, 132*b* facing away from one another such that the cam locks 135*a*, 135*b* on the convex side of the respective cams 132*a*, 132*b* are utilized, it should be recognized that the cam plates 138*a*, 138*b* can be oriented with the concave curvature of the cams 132*a*, 132*b* facing toward from one another such that the cam locks 135*a*, 135*b* on the concave side of the respective cams 132*a*, 132*b* are utilized. The cam plates 138*a*, 138*b* can alternatively be oriented as in FIGS. 8A-8D where the cams 132*a*, 132*b* are oriented in the same direction. This configuration also utilizes the cam locks 135*a*, 135*b* on the concave side of the respective cams 132*a*, 132*b*.

Figure 9:
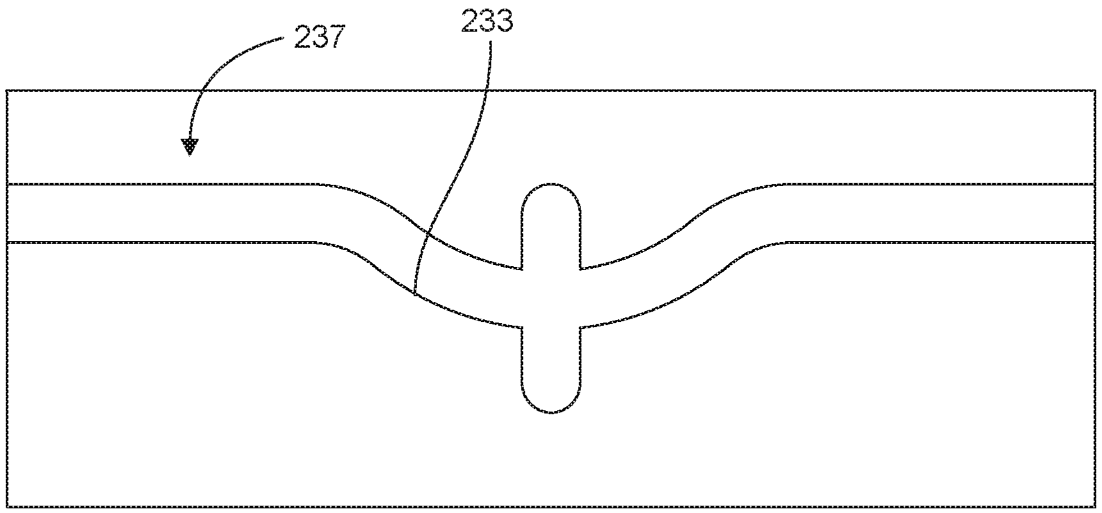
FIG. 9 illustrates a cam in accordance with an example of the present disclosure.

In one aspect, the cam followers 134*a*, 134*b* can remain in engagement with the respective cam surfaces 133*a*, 133*b* once engaged as the drawers 120*a*, 120*b* are moved from the retracted positions to the extended positions. In the example illustrated in FIGS. 6A-8D, the cam surfaces 133*a*, 133*b* are continuous and unbroken throughout the range of motion of the drawers 120*a*, 120*b*. In addition, the cam surfaces 133*a*, 133*b* are configured to be angled non-perpendicular to the direction 102*a*, 102*b* for the range of motion of the drawers 120*a*, 120*b*. Thus, when the cam follower 134*a* is engaged with the cam surface 133*a*, movement of the drawer 120*a* in directions 101*a*, 101*b* causes movement of the cam followers 134*a*, 134*b*. FIG. 9, on the other hand, illustrates a cam surface 233 that is not only configured to remain in engagement with a cam follower (not shown) once engaged as a drawer is moved from a retracted position to an extended position, but the cam surface 233 also includes a portion at 237 that is configured to be oriented perpendicular to a direction of travel of the cam follower (e.g., parallel to a direction of travel of the drawer). Thus, when a cam follower is engaged with the cam surface 233, movement of the drawer causes movement of the cam follower to a point (e.g., such that a connected cam follower is fully engaged with a cam lock), and then the portion at 237 maintains the cam follower in the same location for the remainder of the drawer's travel to the extended position.

Figure 10:
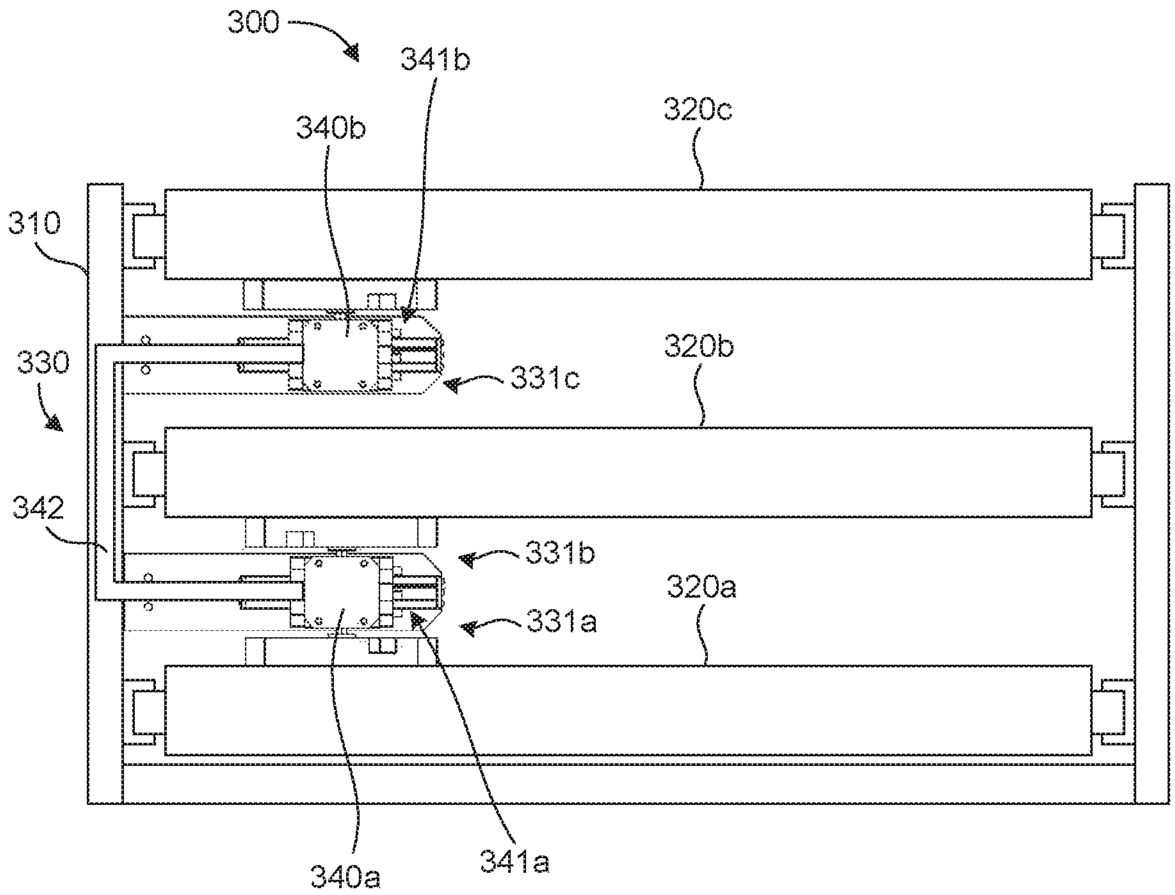
FIG. 10 is a front view of a drawer system in accordance with an example of the present disclosure.

FIG. 10 illustrates a drawer system 300 in accordance with another example of the present disclosure. The drawer system 300 represents many of the concepts discussed above with respect to the drawer system 100 but extends the drawer system 100 to include three or more drawers 320*a-c*. The drawers 320*a-c* can be coupled to one another via a drawer interlock mechanism 330, which includes interlock portions 331*a-c* associated with the respective drawers 320*a-c*. The interlock portions 331*a*, 331*b* are similar to the interlock portions 131*a*, 131*b* discussed above, and include structures for guiding movement of a cam follower relative to a frame 310, such as a carriage 340*a* and a slider assembly 341*a*. In this case, the interlock portion 331*c* includes separate structures for guiding a cam follower relative to the frame 310, specifically a carriage 340*b* and a slider assembly 341*b*. The carriages 340*a*, 340*b* can be coupled to one another by a connecting arm 342 to maintain the carriages 340*a*, 340*b* (and associated cam followers) in a fixed spatial relationship with one another. The connecting arm 342 can be coupled directly to one or both of the carriages 340*a*, 340*b* or coupled to a sliding portion of one or both of the slider assemblies 341*a*, 341*b*. The connecting arm 342 can be configured to extend laterally outward around the drawer 320*b* in order to connect to structures that are located between the drawers 320*a-b* and the drawers 320*b-c* without interfering with drawer movement. It should be recognized that any number of drawers can be coupled to one another in this manner.

Figure 11:
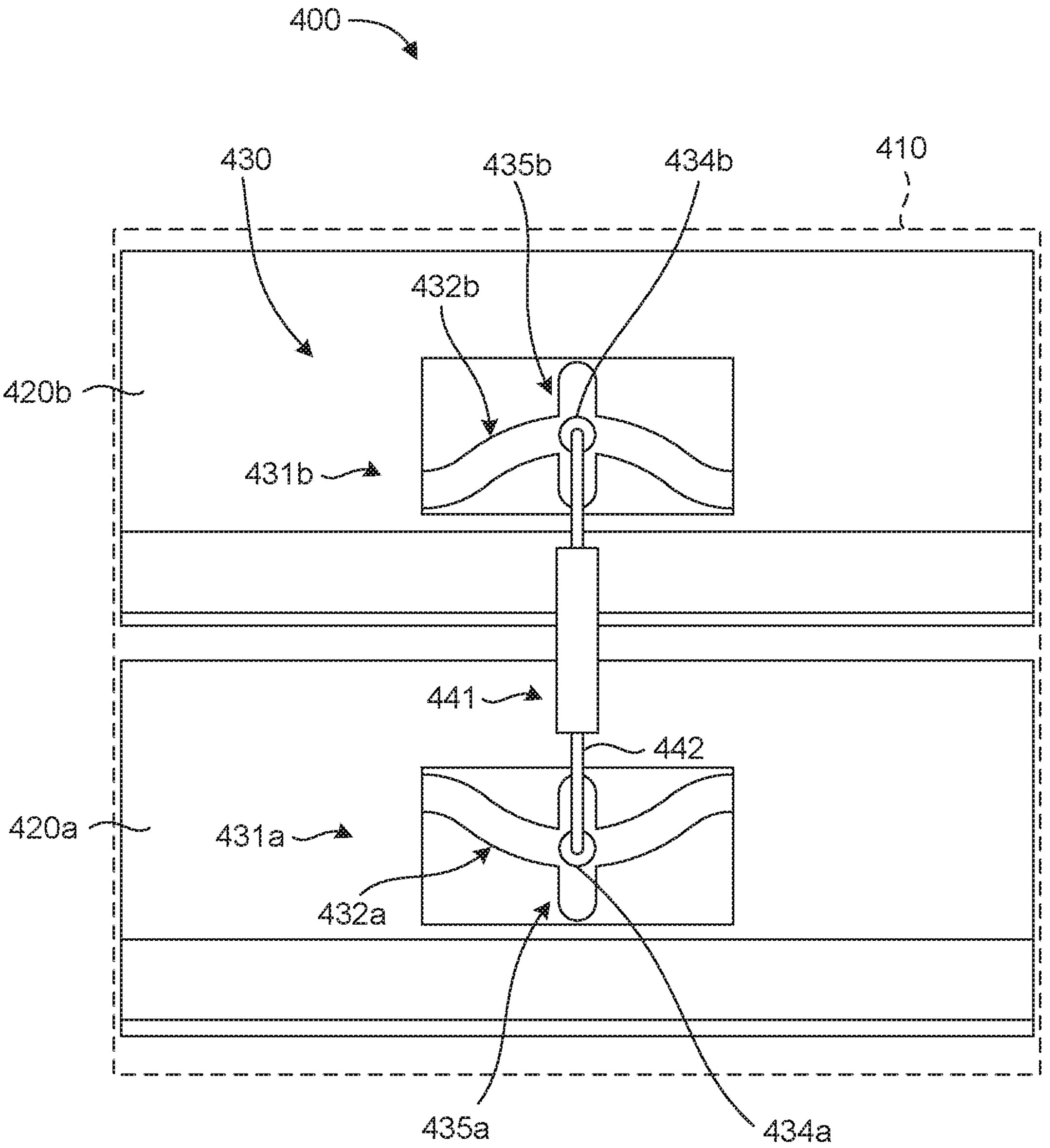
FIG. 11 is a side view of a drawer system in accordance with an example of the present disclosure.

FIG. 11 illustrates a side view of a drawer system 400 in accordance with another example of the present disclosure. The drawer system 400 is similar conceptually to the drawer system 100 discussed above, but instead of locating drawer interlock mechanism structures between drawers 420*a*, 420*b*, a drawer interlock mechanism 430 of the drawer system 400 is located on lateral sides of the drawers 420*a*, 420*b*. For example, interlock portions 431*a*, 431*b* of the drawer interlock mechanism 430 are associated with lateral sides of the respective drawers 420*a*, 420*b*. In particular, a cam 432*a* and a cam lock 435*a* of the interlock portion 431*a* are coupled to a lateral side of the drawer 420*a*, and a cam 432*b* and a cam lock 435*b* of the interlock portion 431*b* are coupled to a lateral side of the drawer 420*b*. The interlock portions 431*a*, 431*b* further include cam followers 434*a*, 434*b*, respectively. The cam followers 434*a*, 434*b* can be coupled to one another by a connecting arm 442 to maintain the cam followers 434*a*, 434*b* in a fixed spatial relationship with one another. The connecting arm 442 can be coupled to, or form a part of, a structure for guiding movement of the cam followers 434*a*, 434*b* relative to a frame 410, such as a slider assembly 441. The slider assembly 441 can be coupled to the frame 410 and configured to facilitate movement of the cam followers 434*a*, 434*b* in a direction transverse (e.g., orthogonal) to movement of the drawers 420*a*, 420*b*. In the example illustrated in FIG. 11, the slider assembly 441 is configured to facilitate vertical movement of the cam followers 434*a*, 434*b*.

FIGS. 12A-12D illustrate action of the drawer interlock mechanism 430 in use, as shown in a series of side views. For clarity, structures such as the frame 410 and the drawers 420*a*, 420*b* have been omitted, although such structures found in FIG. 11 are referenced in describing the operation of the drawer interlock mechanism 430. The operation of the drawer interlock mechanism 430 is similar to that of the drawer interlock mechanism 130 as described above with reference to FIGS. 6A-6D.

Figure 12A:
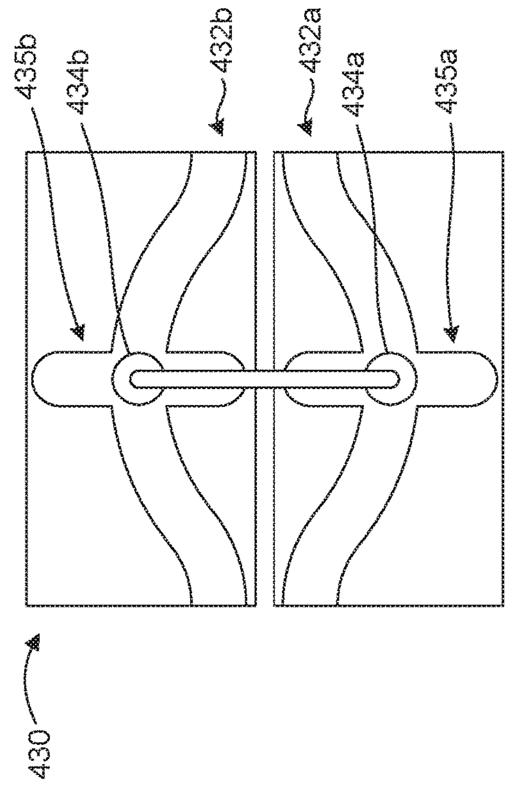
FIGS. 12A-12D are side views of a drawer interlock mechanism of the drawer system of FIG. 11 in operation, in accordance with an example of the present disclosure.
Figure 12B:
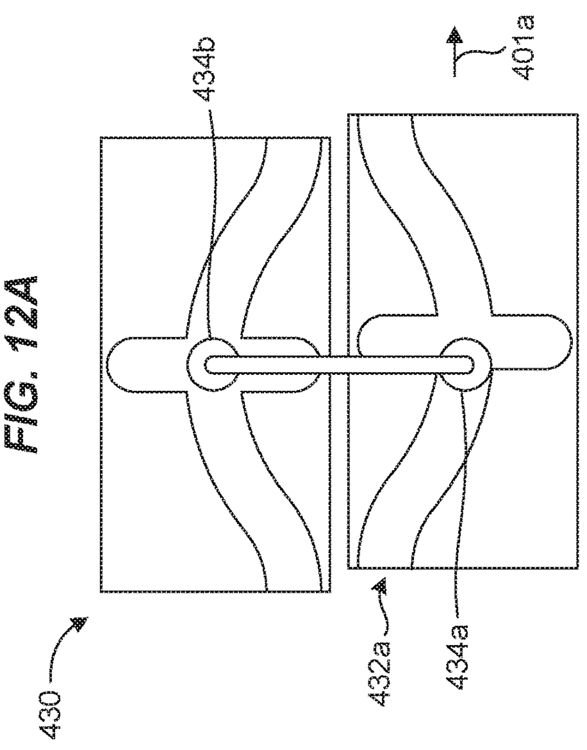
Figure 12C:
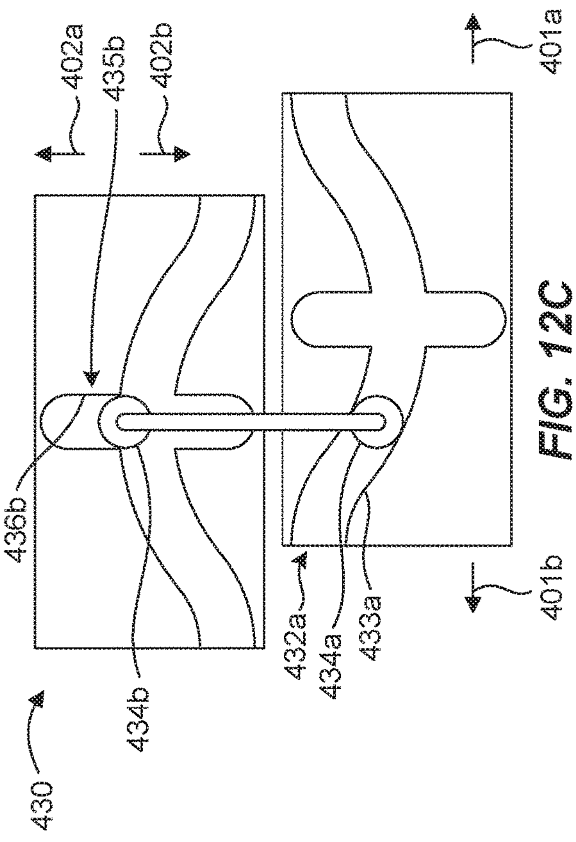
Figure 12D:
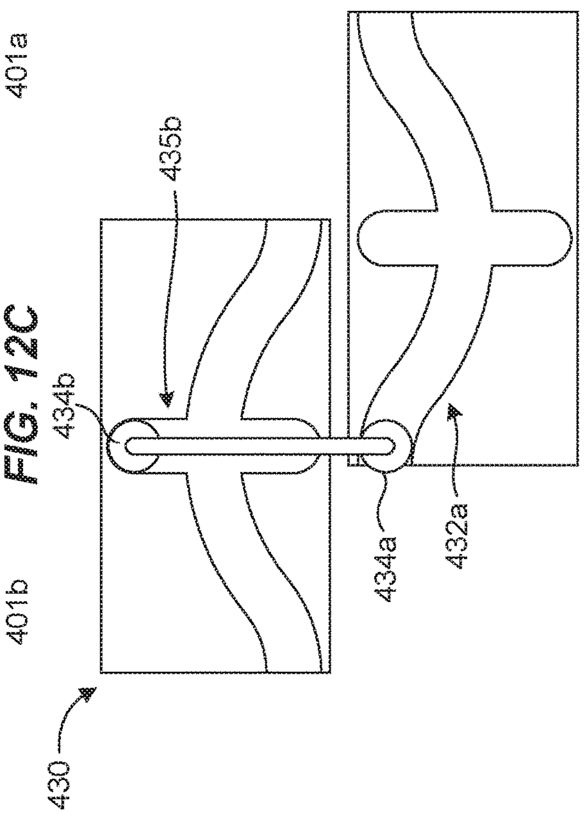

FIG. 12A illustrates the drawer interlock mechanism 430 with the drawers 420*a*, 420*b* in the retracted positions (see FIG. 11). As explained in more detail below, with the drawers 420*a*, 420*b* in the retracted positions, movement of the drawer 420*a* toward its extended position can cause the cam follower 434*a* of the interlock portion 431*a* to engage the cam surface 433*a*, and the cam follower 434*b* of the interlock portion 431*b* to engage the cam lock surface 436*b*, thereby preventing movement of the drawer 420*b* out of its retracted position. For example, in FIG. 12B, the drawer 420*a* is initially moved in direction 401*a* toward the extended position and the cam 432*a* has made initial contact with the cam follower 434*a*. At this point, the cam follower 434*a* has not moved, and therefore the cam follower 434*b* has also not moved. In FIG. 12C, the cam 432*a* has moved further in the direction 401*a* toward the extended position and has now fully engaged the cam follower 434*a*. The cam follower 434*a* is constrained to move in a direction 402 (e.g., due to the slider assembly 441), which is transverse to the direction 401*a*. Thus, as the cam 432*a* moves in direction 401*a*, the cam follower 434*a* is acted on by the cam 432*a* and moves in direction 403*a*. Since the cam follower 434*b* is in a fixed spatial relationship with the cam follower 434*a*, the cam follower 434*b* likewise moves in direction 403*a*. The cam lock 435*b* is configured to receive the cam follower 434*b*, which is moved in direction 403*a* into engagement with the cam lock 435*b*. Because the cam follower 434*b* is constrained to move in a direction that is not parallel to the direction 401*a* (i.e., the direction of travel of the drawer 420*b* from the retracted position to an extended position), the engagement of the cam follower 434*b* with the cam lock 435*b* maintains or locks the drawer 420*b* in place in the retracted position. Thus, movement of the drawer 420*a* toward the extended position is operable to actuate a mechanism that prevents the drawer 420*b* from moving out of the retracted position. FIG. 12D shows the relationship of the cam 432*a* with the cam follower 434*a*, and the relationship of the cam follower 434*b* with the cam lock 435*b* when the drawer 420*a* is moved fully into the extended position. The cam 432*a* can be configured to position the cam follower 434*b* into the cam lock 435*b* sufficient to adequately secure the drawer 420*b* and prevent movement of the drawer 420*b* out of the retracted position. In one aspect, the cam 432*a* can be configured with a curved cam interface surface 433*a* to provide a gradual, non-binding engagement with the cam follower 434*a* that provides smooth action during operation.

As the drawer 420*a* is moved in the direction 401*b* and back into place in the retracted position, the cam 432*a* acts on the cam follower 434*a* and causes the cam follower 434*a* to move in direction 403*b*, which also causes the cam follower 434*b* to move in direction 403*b* out of engagement with the cam lock 435*b*. This action resets the cam followers 434*a*, 434*b* to their original positions, where either drawer 420*a*, 420*b* may be moved to the retracted position for access.

Although the above description of FIGS. 12A-12D addresses unidirectional operation of the drawer 420*a* and the drawer interlock mechanism 430, it should be recognized that the drawer 420*a* and the drawer interlock mechanism 430 may be operated bidirectionally (i.e., the drawer 420*a* can also be moved in direction 401*b* from the retracted position to extended position). Additionally, it should be recognized that operation of the drawer interlock mechanism 430 when the drawer 420*b* is moved from the retracted to the extended position(s) is similar to that described above with regard to movement of the drawer 420*a*.

Figure 13A:
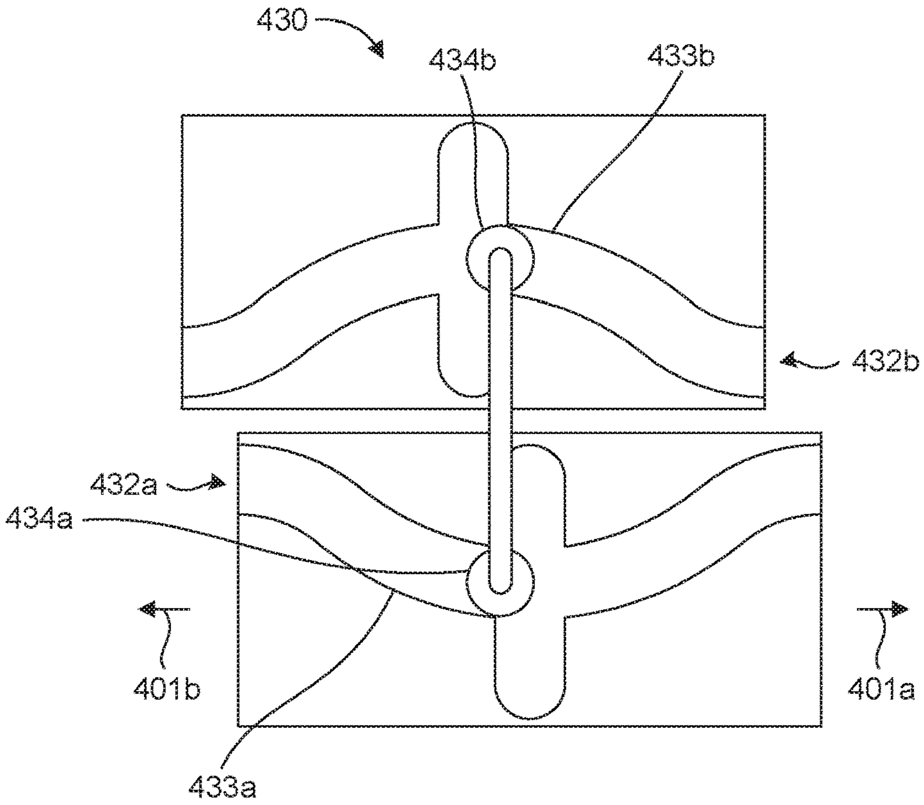
FIGS. 13A and 13B are side views of a drawer interlock mechanism of the drawer system of FIG. 11 showing a binding engagement that prevents simultaneous movement of drawers to extended positions, in accordance with an example of the present disclosure.
Figure 13B:
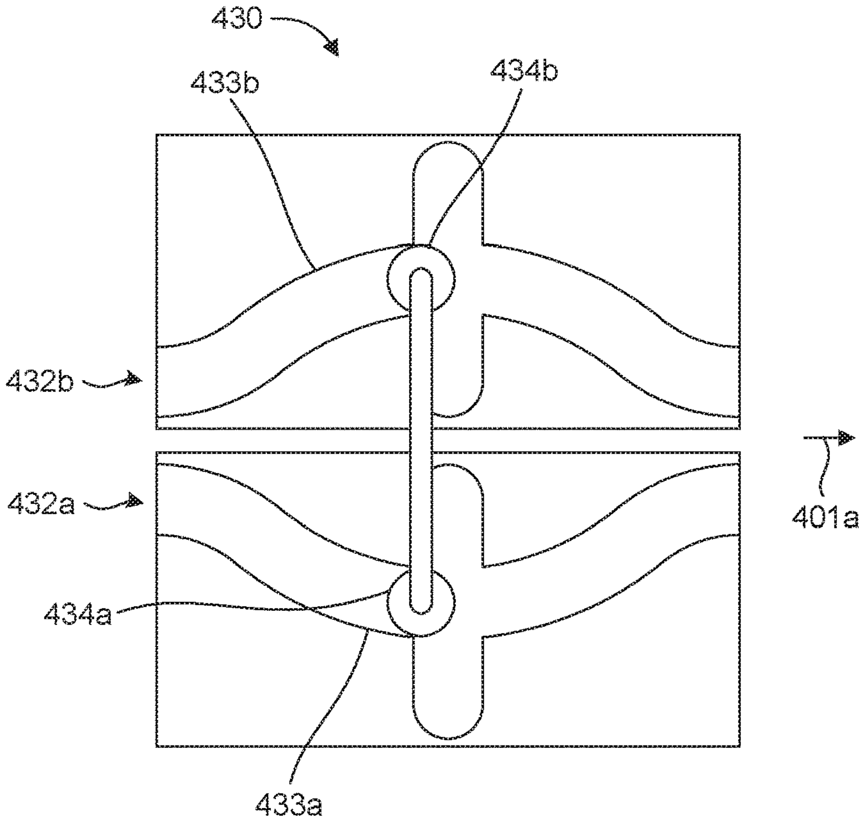
Figure 14A:
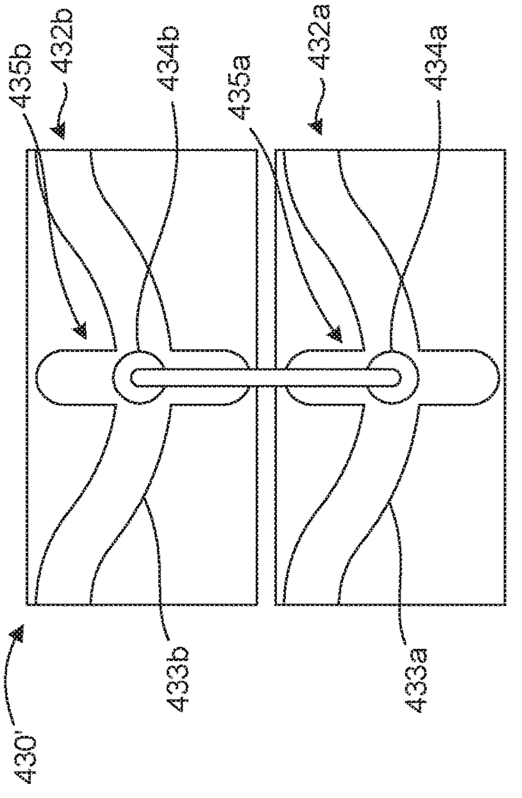
FIGS. 14A-14D are side views of a drawer interlock mechanism in operation, in accordance with an example of the present disclosure.
Figure 14B:
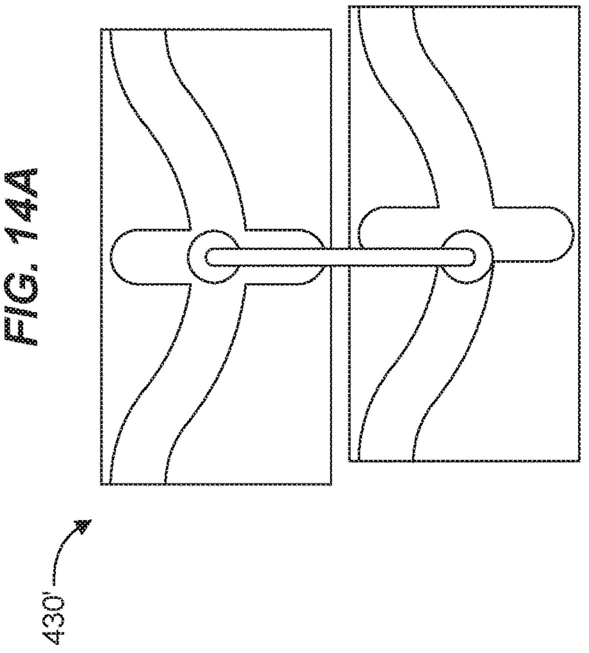
Figure 14C:
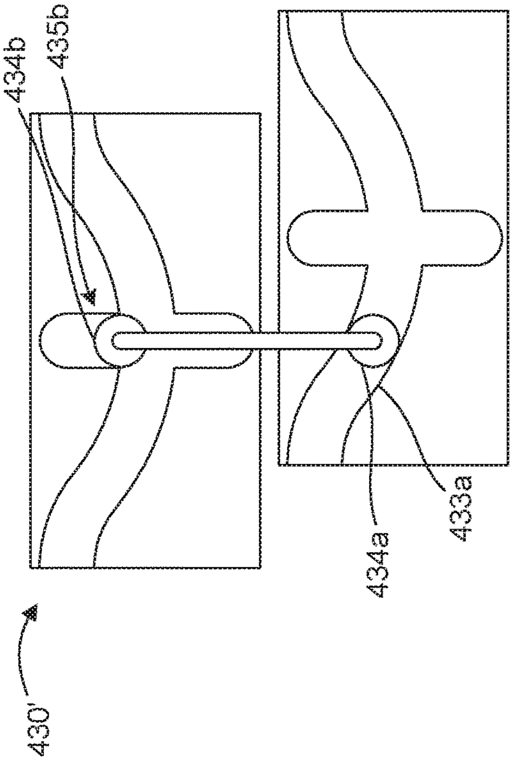
Figure 14D:
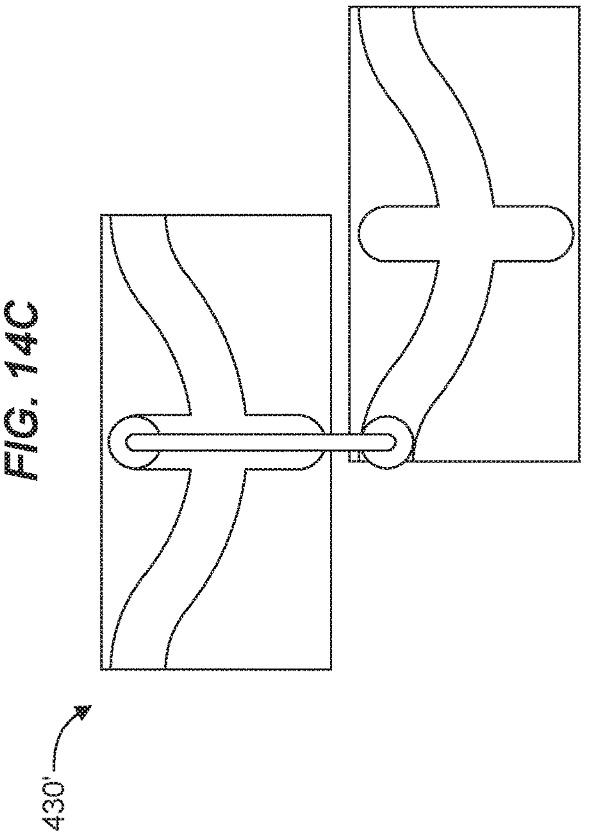

In one aspect, shown in FIGS. 13A and 13B, with the drawers 420*a*, 420*b* in the retracted position, movement of the drawers 420*a*, 420*b* toward an extended position can cause the cam followers 434*a*, 434*b* to bindingly engage the respective cam surfaces 433*a*, 433*b* of the interlock portions 431*a*, 431*b* such that the drawers 420*a*, 420*b* are prevented from moving to the extended positions at the same time. For example, as illustrated in FIG. 13A, movement of the drawers 420*a*, 420*b* in opposite directions 401*a*, 401*b* toward their extended positions can cause the cam followers 434*a*, 434*b* to bindingly engage the respective cams 432*a*, 432*b* (e.g., the cam surfaces 433*a*, 433*b*). As illustrated in FIG. 13B, movement of the drawers 420*a*, 420*b* in the same direction 401*a* (or 401*b*) toward their extended positions can cause the cam followers 434*a*, 434*b* to bindingly engage the respective cams 432*a*, 432*b*. Such a binding engagement can be achieved by configuring the cams 432*a*, 432*b* to cause the respective cam followers 434*a*, 434*b* to follow different paths. This can be accomplished in a variety of ways. In the illustrated example, the cams 432*a*, 432*b* are similarly configured (e.g., similar path configuration or profile (in size, shape, curvature, etc.)) but oppositely oriented or mirrored (e.g., the cam surface 433*a* is oriented concave in one direction and the cam surface 433*b* is oriented concave in the opposite direction). In some examples, the cams 432*a*, 432*b* can be oriented in the same direction, but can have different configurations (e.g., different path configurations or profiles). In one example, the cam 432*a* can have a curved profile and the cam 432*b* can have a linear profile. In another example, the cams 432*a*, 432 can each have a curved profile, but the curvatures can be different or do not match (e.g., one can curve sharply near the retracted position and the other can be less curved near the retracted position).

In one aspect, illustrated in FIGS. 14A-14D, a drawer interlock mechanism 430' can include the cams 432*a*, 432*b* with the cam surfaces 433*a*, 433*b*, respectively, that are similarly configured (e.g., similar path configuration or profile) and similarly oriented (e.g., in the same direction). Operation of the drawer interlock mechanism 430' is similar to that described above for the drawer interlock mechanism 430 in FIGS. 12A-12D. However, because the cams 432*a*, 432*b* are similarly configured and oriented, simultaneously moving associated drawers from retracted to extended positions will not result in binding with the cam followers 434*a*, 434*b*.

In accordance with one embodiment of the present invention, a method for preventing simultaneous movement of multiple bidirectional drawers is disclosed. The method can comprise obtaining first and second drawers, each movable between a retracted position and first and second extended positions on opposite sides of the retracted position. The method can further comprise associating a first interlock portion of a drawer interlock mechanism with the first drawer, the first interlock portion having a cam with a cam surface, and a cam follower operable to interface with the cam surface. Additionally, the method can comprise associating a second interlock portion of the drawer interlock mechanism with the second drawer, the second interlock portion having a cam lock with a cam lock surface, and cam follower operable to interface with the cam lock surface, wherein, with the first and second drawers in the retracted positions, movement of the first drawer toward the first extended position causes the cam follower of the first interlock portion to engage the cam surface and the cam follower of the second interlock portion to engage the cam lock surface thereby preventing movement of the second drawer out of the retracted position. It is noted that no specific order is required in this method, though generally in one embodiment, these method steps can be carried out sequentially.

In accordance with one embodiment of the present invention, a method for preventing simultaneous movement of multiple drawers is disclosed. The method can comprise obtaining first and second drawers, each movable between a retracted position and an extended position. Additionally, the method can comprise associating first and second interlock portions of a drawer interlock mechanism with the first and second drawers, respectively, each of the first and second interlock portions having a cam with a cam surface, and a cam follower operable to interface with the cam surface, wherein, with the first and second drawers in the retracted positions, movement of the first and second drawers toward the extended positions causes the cam followers of the first and second interlock portions to bindingly engage the respective cam surfaces of the first and second interlock portions such that the first and second drawers are prevented from moving to the extended positions. In one aspect of the method, the cam surfaces of the first and second interlock portions are oppositely oriented to cause the cam followers of the first and second interlock portions to bindingly engage the respective cam surfaces of the first and second interlock portions. It is noted that no specific order is required in this method, though generally in one embodiment, these method steps can be carried out sequentially.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A bidirectional drawer system, comprising:

a frame;

first and second drawers slidably coupled to the frame, each of the first and second drawers being movable between a retracted position and first and second extended positions on opposite sides of the retracted position;

a drawer interlock mechanism comprising first and second interlock portions associated with the first and second drawers, respectively, the first interlock portion having a cam with a cam surface, and a cam follower operable to interface with the cam surface, and the second interlock portion having a cam lock with a cam lock surface, and cam follower operable to interface with the cam lock surface, wherein, with the first and second drawers in the retracted positions, movement of the first drawer toward the first extended position causes the cam follower of the first interlock portion to engage the cam surface and the cam follower of the second interlock portion to engage the cam lock surface thereby preventing movement of the second drawer out of the retracted position, and wherein, with the first and second drawers in the retracted positions, movement of the first drawer toward the second extended position causes the cam follower of the first interlock portion to engage the cam surface, and the cam follower of the second interlock portion to engage the cam lock surface thereby preventing movement of the second drawer out of the retracted positions.

2. The bidirectional drawer system of claim 1, wherein the first interlock portion further comprises a cam lock with a cam lock surface, the cam follower of the first interlock portion being operable to interface with the cam lock surface of the first interlock portion, and the second interlock portion further comprises a cam with a cam surface, the cam follower of the second interlock portion being operable to interface with the cam surface of the second interlock portion, and wherein, with the first and second drawers in the retracted positions, movement of the second drawer toward the first extended position causes the cam follower of the second interlock portion to engage the cam surface of the second interlock portion and the cam follower of the first interlock portion to engage the cam lock surface of the first interlock portion thereby preventing movement of the first drawer out of the retracted position.

3. The bidirectional drawer system of claim 2, wherein, with the first and second drawers in the retracted position, movement of the second drawer toward the second extended position causes the cam follower of the second interlock portion to engage the cam surface of the second interlock portion and the cam follower of the first interlock portion to engage the cam lock surface of the first interlock portion thereby preventing movement of the first drawer out of the retracted position.

4. The bidirectional drawer system of claim 2, wherein, with the first and second drawers in the retracted position, movement of the first drawer toward the first or second extended position and movement of the second drawer toward the first or second extended position causes the cam followers of the first and second interlock portions to bindingly engage the respective cam surfaces of the first and second interlock portions such that the first and second drawers are prevented from moving to the first or second extended positions.

5. The bidirectional drawer system of claim 4, wherein the cam surfaces of the first and second interlock portions are oppositely oriented to cause the cam followers of the first and second interlock portions to bindingly engage the respective cam surfaces of the first and second interlock portions.

6. The bidirectional drawer system of claim 2, wherein the cam surfaces of the first and second interlock portions are similarly configured and oriented.

7. The bidirectional drawer system of claim 1, wherein the cam follower of the first interlock portion remains in engagement with the cam surface once engaged as the first drawer is moved from the retracted position to the first extended position.

8. The bidirectional drawer system of claim 1, wherein the second interlock portion further comprises a cam with a cam surface, the cam follower of the second interlock portion being operable to interface with the cam surface of the second interlock portion, and wherein the cams of the first and second interlock portions are coupled to the first and second drawers, respectively, and the cam followers of the first and second interlock portions are coupled to one another in a fixed relationship.

9. The bidirectional drawer system of claim 8, wherein the cam of the first interlock portion is coupled to a top side of the first drawer, and the cam of the second interlock portion is coupled to a bottom side of the second drawer.

10. The bidirectional drawer system of claim 8, wherein the cam of the first interlock portion is coupled to a lateral side of the first drawer, and the cam of the second interlock portion is coupled to a lateral side of the second drawer.

11. The bidirectional drawer system of claim 8, further comprising a carriage slidably coupled to the frame, wherein the cam followers of the first and second interlock portions are coupled to, and supported by, the carriage.

12. The bidirectional drawer system of claim 1, further comprising a position lock mechanism operable to resist movement of the first and second drawers from at least one of the retracted position, the first extended position, or the second extended position.

13. The bidirectional drawer system of claim 12, wherein the position lock mechanism comprises a detent.

14. A method for preventing simultaneous movement of multiple bidirectional drawers, comprising:

obtaining first and second drawers, each movable between a retracted position and first and second extended positions on opposite sides of the retracted position;

associating a first interlock portion of a drawer interlock mechanism with the first drawer, the first interlock portion having a cam with a cam surface, and a cam follower operable to interface with the cam surface; and associating a second interlock portion of the drawer interlock mechanism with the second drawer, the second interlock portion having a cam lock with a cam lock surface, and cam follower operable to interface with the cam lock surface, wherein, with the first and second drawers in the retracted positions, movement of the first drawer toward the first extended position causes the cam follower of the first interlock portion to engage the cam surface and the cam follower of the second interlock portion to engage the cam lock surface thereby preventing movement of the second drawer out of the retracted position, wherein, with the first and second drawers in the retracted positions, movement of the first drawer toward the second extended position causes the cam follower of the first interlock portion to engage the cam surface, and the cam follower of the second interlock portion to engage the cam lock surface thereby preventing movement of the second drawer out of the retracted positions.

15. A bidirectional drawer system, comprising:

a frame;

first and second drawers slidably coupled to the frame, each of the first and second drawers being movable between a retracted position and first and second extended positions on opposite sides of the retracted position;

a drawer interlock mechanism comprising first and second interlock portions associated with the first and second drawers, respectively, the first interlock portion having a cam with a cam surface, and a cam follower operable to interface with the cam surface, and the second interlock portion having a cam lock with a cam lock surface, and cam follower operable to interface with the cam lock surface, wherein, with the first and second drawers in the retracted positions, movement of the first drawer toward the first extended position causes the cam follower of the first interlock portion to engage the cam surface and the cam follower of the second interlock portion to engage the cam lock surface thereby preventing movement of the second drawer out of the retracted position, and wherein the first interlock portion further comprises a cam lock with a cam lock surface, the cam follower of the first interlock portion being operable to interface with the cam lock surface of the first interlock portion, and the second interlock portion further comprises a cam with a cam surface, the cam follower of the second interlock portion being operable to interface with the cam surface of the second interlock portion, and wherein, with the first and second drawers in the retracted positions, movement of the second drawer toward the first extended position causes the cam follower of the second interlock portion to engage the cam surface of the second interlock portion and the cam follower of the first interlock portion to engage the cam lock surface of the first interlock portion thereby preventing movement of the first drawer out of the retracted position.

16. A bidirectional drawer system, comprising:

a frame;

first and second drawers slidably coupled to the frame, each of the first and second drawers being movable between a retracted position and first and second extended positions on opposite sides of the retracted position;

a drawer interlock mechanism comprising first and second interlock portions associated with the first and second drawers, respectively, the first interlock portion having a cam with a cam surface, and a cam follower operable to interface with the cam surface, and the second interlock portion having a cam lock with a cam lock surface, and cam follower operable to interface with the cam lock surface, wherein, with the first and second drawers in the retracted positions, movement of the first drawer toward the first extended position causes the cam follower of the first interlock portion to engage the cam surface and the cam follower of the second interlock portion to engage the cam lock surface thereby preventing movement of the second drawer out of the retracted position, and wherein the second interlock portion further comprises a cam with a cam surface, the cam follower of the second interlock portion being operable to interface with the cam surface of the second interlock portion, and wherein the cams of the first and second interlock portions are coupled to the first and second drawers, respectively, and the cam followers of the first and second interlock portions are coupled to one another in a fixed relationship.

* * * * *